(12) United States Patent
Zhang et al.

(10) Patent No.: US 12,557,503 B2
(45) Date of Patent: Feb. 17, 2026

(54) DISPLAY SUBSTRATE AND PREPARATION METHOD THEREFOR, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Shun Zhang, Beijing (CN); Yuanqi Zhang, Beijing (CN); Fan He, Beijing (CN); Yi Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 717 days.

(21) Appl. No.: 17/908,542

(22) PCT Filed: Oct. 15, 2021

(86) PCT No.: PCT/CN2021/124177
§ 371 (c)(1),
(2) Date: Sep. 1, 2022

(87) PCT Pub. No.: WO2023/060581
PCT Pub. Date: Apr. 20, 2023

(65) Prior Publication Data
US 2024/0206271 A1 Jun. 20, 2024

(51) Int. Cl.
*H10K 59/131* (2023.01)
*G06F 3/041* (2006.01)
(Continued)

(52) U.S. Cl.
CPC ......... *H10K 59/1315* (2023.02); *G06F 3/041* (2013.01); *H10K 59/1201* (2023.02);
(Continued)

(58) Field of Classification Search
CPC .................. H10K 59/131; H10K 59/1315
See application file for complete search history.

(56) References Cited

U.S. PATENT DOCUMENTS

| 10,516,135 B1 * | 12/2019 | Shim | G09G 3/3258 |
| 2005/0023956 A1 * | 2/2005 | Kwak | H10K 59/1315 |
| | | | 313/497 |

(Continued)

FOREIGN PATENT DOCUMENTS

| CN | 107092400 A | 8/2017 |
| CN | 109725755 A | 5/2019 |

(Continued)

OTHER PUBLICATIONS

International Search Report, International Searching Authority, International application No. PCT/CN2021/124177, Apr. 28, 2022, all pages. (Year: 2022).*

(Continued)

*Primary Examiner* — Victoria K. Hall
(74) *Attorney, Agent, or Firm* — Ling Wu; Stephen Yang; Ling and Yang Intellectual Property

(57) ABSTRACT

A display substrate and a preparation method thereof, and a display apparatus, wherein on a plane perpendicular to the display substrate, the display substrate includes a source-drain metal layer located on a base substrate, an insulating layer located on the source-drain metal layer, and a touch metal layer located on the insulating layer, the source-drain metal layer includes a first wiring, the touch metal layer includes a second wiring, there is an overlapping area between an orthographic projection of the first wiring on the base substrate and an orthographic projection of the second wiring on the base substrate; and the first wiring and the second wiring form a double-layer wiring structure.

13 Claims, 14 Drawing Sheets

(51) Int. Cl.
  *H10K 59/12* (2023.01)
  *H10K 59/40* (2023.01)
  *H10K 71/00* (2023.01)

(52) U.S. Cl.
  CPC ........... *H10K 59/131* (2023.02); *H10K 59/40* (2023.02); *H10K 71/00* (2023.02)

(56) References Cited

U.S. PATENT DOCUMENTS

| | | | |
|---|---|---|---|
| 2019/0103443 A1 | 4/2019 | Kim et al. | |
| 2019/0131354 A1* | 5/2019 | Lee | H10K 59/40 |
| 2019/0237533 A1* | 8/2019 | Kim | H10K 59/126 |
| 2020/0027929 A1 | 1/2020 | Lee et al. | |
| 2021/0119177 A1* | 4/2021 | Bang | G06F 3/0445 |
| 2021/0280641 A1* | 9/2021 | Bang | H10K 50/844 |
| 2021/0399079 A1* | 12/2021 | Yan | H10K 59/40 |
| 2022/0157913 A1* | 5/2022 | Choi | H10K 59/131 |
| 2023/0161428 A1* | 5/2023 | Yan | G06F 3/04164 |
| | | | 345/173 |

FOREIGN PATENT DOCUMENTS

| | | | | |
|---|---|---|---|---|
| CN | 110739329 A | | 1/2020 | |
| CN | 213042915 U | * | 4/2021 | ............. H01L 27/32 |

OTHER PUBLICATIONS

Written Opinion of the International Searching Authority, International Searching Authority, International application No. PCT/CN2021/124177, Apr. 28, 2022, all pages. (Year: 2022).*

The State Intellectual Property Office of People's Republic of China, The Second Office Action, Chinese Pat. App. No. 202180002937.0, Aug. 22, 2025, all pages. (Year: 2025).*

Machine translation, Zhang, Chinese Pat. Pub. No. CN213042915U, translation date: Sep. 28, 2025, Espacenet, all pages. (Year: 2025).*

* cited by examiner

PLN 10 11 VDD

PLN 10 11 VSS 420 503 410

504 600 505 602 508 601

PLN 504 10  11 VSS 505 420  503  410

PLN  10  11 VDD     504 505

100 # DISPLAY SUBSTRATE AND PREPARATION METHOD THEREFOR, AND DISPLAY APPARATUS

CROSS-REFERENCE TO RELATED APPLICATION

The present application is a U.S. National Phase Entry of International Application PCT/CN2021/124177 having an international filing date of Oct. 15, 2021, and the contents disclosed in the above-mentioned application are hereby incorporated as a part of this application.

TECHNICAL FIELD

The present disclosure relates to, but is not limited to, the field of display technologies, and in particular to a display substrate, a method for preparing the display substrate, and a display apparatus.

BACKGROUND

An Organic Light Emitting Diode (OLED) and a Quantum-dot Light Emitting Diode (QLED) are active light emitting display devices and have advantages such as self-luminescence, wide viewing angle, high contrast ratio, low power consumption, extremely high response speed, lightness and thinness, flexibility, low cost, etc. With constant development of display technologies, a flexible display using an OLED or a QLED as a light emitting device and with signals controlled by a Thin Film Transistor (TFT) has become a mainstream product in the field of display at present.

SUMMARY

The following is a summary of subject matter described herein in detail. The summary is not intended to limit the protection scope of claims.

An embodiment of the present disclosure provides a display substrate, wherein on a plane perpendicular to the display substrate, the display substrate includes a source-drain metal layer located on a base substrate, an insulating layer located on the source-drain metal layer, and a touch metal layer located on the insulating layer, the source-drain metal layer includes a first wiring, the touch metal layer includes a second wiring, there is an overlapping area between an orthographic projection of the first wiring on the base substrate and an orthographic projection of the second wiring on the base substrate, and the first wiring and the second wiring form a double-layer wiring structure.

In an exemplary embodiment, the display substrate includes a display area, a bonding area located on a side of the display area, and a bezel area located on other sides of the display area, the bonding area includes a first fan-out region and a bonding pin region;

the first wiring includes a first power supply line, the second wiring includes a first auxiliary power supply line, the first power supply line is located in the bezel area and the first fan-out region, and extends from the first fan-out region to the bonding pin region, the first auxiliary power supply line is located in the bezel area and the first fan-out region, there is an overlapping area between an orthographic projection of the first power supply line on the base substrate and an orthographic projection of the first auxiliary power supply line on the base substrate; and the first power supply line and the first auxiliary power supply line are electrically connected through a groove or a via hole penetrating the insulating layer.

In an exemplary embodiment, the touch metal layer includes a first touch metal layer and a second touch metal layer;
the first auxiliary power supply line is arranged in a same layer as the first touch metal layer; or,
the first auxiliary power supply line is arranged in a same layer as the second touch metal layer; or,
the first auxiliary power supply line includes a first sub-wiring and a second sub-wiring, the first sub-wiring is arranged in a same layer as the first touch metal layer, and the second sub-wiring is arranged in a same layer as the second touch metal layer.

In an exemplary embodiment, the bezel area includes at least one isolation dam disposed around the display area;
an orthographic projection of the first auxiliary power supply line on the base substrate does not overlap with an orthographic projection of the at least one isolation dam on the base substrate, and a distance between the first auxiliary power supply line and the display area is greater than a distance between the isolation dam and the display area.

In an exemplary embodiment, the bezel area includes at least one isolation dam disposed around the display area;
an orthographic projection of the first auxiliary power supply line on the base substrate at least covers a portion of an orthographic projection of the isolation dam on the base substrate.

In an exemplary embodiment, the insulating layer includes an encapsulation structure layer, a buffer layer and a touch insulating layer; the groove includes a first groove and a third groove, the first groove penetrates the touch insulating layer and the buffer layer, and the third groove penetrates the encapsulation structure layer.

In an exemplary embodiment, an orthographic projection of the first groove on the base substrate covers an orthographic projection of the third groove on the base substrate.

In an exemplary embodiment, the source-drain metal layer includes a first source-drain metal layer and a second source-drain metal layer;
the first power supply line is arranged in a same layer as the first source-drain metal layer; or
the first power supply line is arranged in a same layer as the second source-drain metal layer; or
the first power supply line includes a third sub-wiring and a fourth sub-wiring, the third sub-wiring is arranged in a same layer as the first source-drain metal layer, and the fourth sub-wiring is arranged in a same layer as the second source-drain metal layer.

In an exemplary embodiment, the display substrate includes a display area and a bonding area located on a side of the display area, the bonding area sequentially includes a first fan-out region, a bending region, a drive chip region and a bonding pin region in a direction away from the display area;
the first wiring includes a second power supply line, the second wiring includes a second auxiliary power supply line, the second power supply line is located in the display area and the first fan-out region, and extends from the first fan-out region to the bonding pin region, the second auxiliary power supply line is located in the bonding area and located on a side of the bending region away from the display area, and there is an overlapping area between an orthographic projection of the second power supply line on the base substrate and an orthographic projection of the second auxiliary power supply line on the base substrate; and the second power supply line and the second auxiliary power supply line are electrically connected through a groove or a via hole penetrating the insulating layer.

In an exemplary embodiment, the touch metal layer includes a first touch metal layer and a second touch metal layer;

the second auxiliary power supply line is arranged in a same layer as the first touch metal layer; or the second auxiliary power supply line is arranged in a same layer as the second touch metal layer; or the second auxiliary power supply line includes a fifth sub-wiring and a sixth sub-wiring, the fifth sub-wiring is arranged in a same layer as the first touch metal layer, and the sixth sub-wiring is arranged in a same layer as the second touch metal layer.

In an exemplary embodiment, in the bonding area, the second power supply line includes a first transverse connection portion extending in a first direction and a first longitudinal connection portion extending in a second direction; the second auxiliary power supply line includes a second transverse connection portion extending in the first direction and a second longitudinal connection portion extending in the second direction;

the first transverse connection portion and the second transverse connection portion are each arranged between the bending region and the drive chip region, there is an overlapping area between an orthographic projection of the first transverse connection portion on the base substrate and an orthographic projection of the second transverse connection portion on the base substrate; and there is an overlapping area between an orthographic projection of the first longitudinal connection portion on the base substrate and an orthographic projection of the second longitudinal connection portion on the base substrate.

In an exemplary embodiment, the first longitudinal connection portion includes multiple first branches and multiple second branches, the first branches extend from an end of the first transverse connection portion in the first direction to the bonding pin region, the second branches extend from the first transverse connection portion to the display area, the second longitudinal connection portion extends from an end of the second transverse connection portion in the first direction to the bonding pin region, and there is an overlapping area between an orthographic projection of the first branches on the base substrate and an orthographic projection of the second longitudinal connection portion on the base substrate.

In an exemplary embodiment, the source-drain metal layer includes a first source-drain metal layer and a second source-drain metal layer;

the second power supply line is arranged in a same layer as the first source-drain metal layer; or the second power supply line is arranged in a same layer as the second source-drain metal layer; or the second power supply line includes a seventh sub-wiring and an eighth sub-wiring, the seventh sub-wiring is arranged in a same layer as the first source-drain metal layer, and the eighth sub-wiring is arranged in a same layer as the second source-drain metal layer.

In an exemplary embodiment, the display substrate includes a display area, and a bonding area located on a side of the display area, the bonding area includes a drive chip region, a bonding pin region, and an input-output wiring located between the drive chip region and the bonding pin region; the drive chip region includes a drive chip pin, the bonding pin region includes a bonding pin, the input-output wiring is connected to the drive chip pin and the bonding pin; and the first wiring includes a first input-output wiring, the second wiring includes a second input-output wiring, and there is an overlapping area between an orthographic projection of the first input-output wiring on the base substrate and an orthographic projection of the second input-output wiring on the base substrate.

In an exemplary embodiment, the touch metal layer includes a first touch metal layer and a second touch metal layer;

the second input-output wiring is arranged in a same layer as the first touch metal layer; or the second input-output wiring is arranged in a same layer as the second touch metal layer; or the second input-output wiring includes a ninth sub-wiring and a tenth sub-wiring, the ninth sub-wiring is arranged in a same layer as the first touch metal layer, and the tenth sub-wiring is arranged in a same layer as the second touch metal layer.

In an exemplary embodiment, an insulating layer is included between the source-drain metal layer and the touch metal layer, and the first input-output wiring and the second input-output wiring are electrically connected through a groove or a via hole penetrating the insulating layer.

In an exemplary embodiment, an insulating layer is included between the source-drain metal layer and the touch metal layer, the first input-output wiring and the second input-output wiring are isolated from each other by the insulating layer, and are electrically connected through the drive chip pin and the bonding pin.

In an exemplary embodiment, the source-drain metal layer includes a first source-drain metal layer and a second source-drain metal layer;

the first input-output wiring is arranged in a same layer as the first source-drain metal layer; or, the first input-output wiring is arranged in a same layer as the second source-drain metal layer; or, the first input-output wiring includes an eleventh sub-wiring and a twelfth sub-wiring, the eleventh sub-wiring is arranged in a same layer as the first source-drain metal layer, and the twelfth sub-wiring is arranged in a same layer as the second source-drain metal layer.

An embodiment of the present disclosure further provides a display apparatus, including the display substrate described in any one of the above.

An embodiment of the present disclosure further provides a method for preparing a display substrate, including:

forming a source-drain metal layer, the source-drain metal layer including a first wiring;

forming an insulating layer on the source-drain metal layer;

forming a touch metal layer on the insulating layer, wherein the touch metal layer includes a second wiring, there is an overlapping area between an orthographic projection of the first wiring on a base substrate and an orthographic projection of the second wiring on the base substrate, and the first wiring and the second wiring form a double-layer wiring structure.

Other aspects may be understood upon reading and understanding the drawings and the detailed description.

BRIEF DESCRIPTION OF DRAWINGS

Accompanying drawings are intended to provide further understanding of technical solutions of the present disclosure and form a portion of the specification, and are intended to explain the technical solutions of the present disclosure together with embodiments of the present application and do not constitute a limitation on the technical solutions of the present disclosure. Shapes and sizes of various components in the drawings do not reflect actual scales, and are only intended to schematically illustrate contents of the present disclosure.

FIG. 7b to FIG. 7g are sectional views of A-A' area in FIG. 7a.

FIG. 7h to FIG. 7j are sectional views of B-B' area in FIG. 7a.

FIG. 8b is a sectional view of A-A' area in FIG. 8a.

FIG. 8c is a sectional view of B-B' area in FIG. 8a.

FIG. 10b is a sectional view of A-A' area in FIG. 10a.

FIG. 10c is a sectional view of B-B' area in FIG. 10a.

FIG. 11b is a sectional view of A-A' area in FIG. 11a.

FIG. 12b is a sectional view of D-D' area in FIG. 12a.

FIG. 13b to FIG. 13e are sectional views of C-C' area in FIG. 13a.

DETAILED DESCRIPTION

Figure 1:
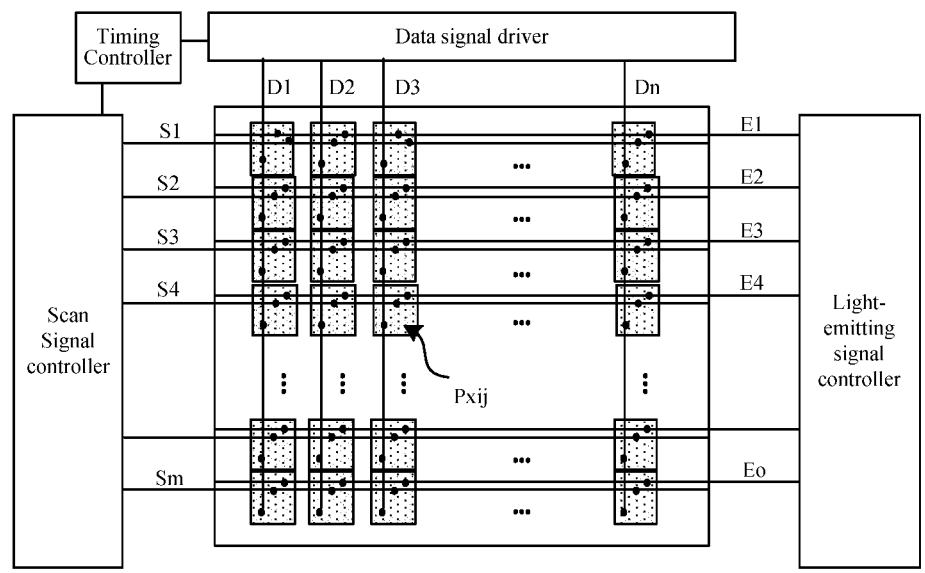
FIG. 1 is a schematic diagram of a structure of a display apparatus.

To make objectives, technical solutions, and advantages of the present disclosure clearer, the embodiments of the present disclosure will be described below in detail with reference to the accompanying drawings. It is to be noted that implementations may be carried out in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict. In order to keep the following description of the embodiments of the present disclosure clear and concise, detailed descriptions about part of known functions and known components are omitted in the present disclosure. The drawings of the embodiments of the present disclosure only involve structures involved in the embodiments of the present disclosure, and as to other structures, reference may be made to usual designs.

Scales of the drawings in the present disclosure may be used as a reference in the actual process, but are not limited thereto. For example, a width-length ratio of a channel, a thickness and spacing of each film layer, and a width and spacing of each signal line may be adjusted according to actual needs. The number of pixels in the display substrate and the number of sub-pixels in each pixel are not limited to the number shown in the drawings. The drawings described in the present disclosure are schematic structure diagrams only, and one implementation of the present disclosure is not limited to the shapes, numerical values or the like shown in the drawings.

Ordinal numerals such as "first", "second", and "third" in the specification are set to avoid confusion between constituent elements, but not to set a limit in quantity.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand specific meanings of these terms in the present disclosure according to specific situations.

In the specification, a transistor refers to a component which at least includes three terminals, i.e., a gate electrode, a drain electrode and a source electrode. The transistor has a channel region between the drain electrode (drain electrode terminal, drain region, or drain electrode) and the source electrode (source electrode terminal, source region, or source electrode), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchanged. Therefore, the "source electrode" and the "drain electrode" are interchangeable in the specification.

In the specification, "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include electrodes and wirings, but also include switch elements such as transistors, resistors, inductors, capacitors, other elements with various functions, etc.

In the specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulating film" may be replaced with an "insulating layer" sometimes.

Triangle, rectangle, trapezoid, pentagon, hexagon or the like in this specification is not strictly defined, and may be approximate triangle, rectangle, trapezoid, pentagon, hexagon or the like. There may be some small deformation caused by tolerance, and there may be guide angle, arc edge and deformation, etc.

In the present disclosure, "about" refers to that a boundary is defined not so strictly and numerical values within process and measurement error ranges are allowed.

FIG. 1 is a schematic diagram of a structure of a display apparatus. As shown in FIG. 1, the display apparatus may include a timing controller, a data signal driver, a scan signal driver, a light emitting signal driver and a pixel array. The timing controller is connected to the data signal driver, the scan signal driver and the light emitting signal driver, respectively, the data signal driver is connected to multiple data signal lines (D1 to Dn) respectively, the scan signal driver is connected to multiple scan signal lines (S1 to Sm) respectively, and the light emitting signal driver is connected to multiple light emitting signal lines (E1 to Eo) respectively. A pixel array may include multiple sub-pixels Pxij, wherein i and j may be natural numbers. At least one sub-pixel Pxij may include a circuit unit and a light emitting device connected to the circuit unit, wherein the circuit unit may include at least one scan signal line, at least one data signal line, at least one light emitting signal line and a pixel drive circuit. In an exemplary implementation, the timing controller may provide the data signal driver with a gray-scale value and a control signal suitable for a specification of the data signal driver, may provide the scan signal driver with a clock signal, a scan starting signal, etc., suitable for a specification of the scan signal driver, and may provide the light emitting signal driver with a clock signal, an emission stopping signal, etc., suitable for a specification of the light emitting signal driver. The data signal driver may generate a data voltage to be provided to the data signal lines D1, D2, D3, . . . , and Dn by using the gray-scale value and the control signal that are received from the timing controller. For example, the data signal driver may sample the gray-scale value using a clock signal and apply a data voltage corresponding to the gray-scale value to the data signal lines D1 to Dn by taking a pixel row as a unit, wherein n may be a natural number. The scan signal driver may receive the clock signal, the scan starting signal, etc., from the timing controller to generate a scan signal to be provided to the scan signal lines S1, S2, S3, . . . , and Sm. For example, the scan signal driver may sequentially provide a scan signal with an on-level pulse to the scan signal lines S1 to Sm. For example, the scan signal driver may be constructed in a form of a shift register and generate a scan signal in a manner of sequentially transmitting a scan starting signal provided in a form of an on-level pulse to a next-stage circuit under control of the clock signal, wherein m may be a natural number. The light emitting signal driver may receive the clock signal, the emission stopping signal, etc., from the timing controller to generate an emission signal to be provided to the light emitting signal lines E1, E2, E3, . . . , and Eo. For example, the light emitting signal driver may sequentially provide an emission signal with an off-level pulse to the light emitting signal lines E1 to Eo. For example, the light emitting signal driver may be constructed in a form of a shift register and may generate an emission signal in such a manner as to transmit sequentially the emission stopping signal provided in a form of an off-level pulse to a next-stage circuit under the control of the clock signal, wherein o may be a natural number.

Figure 2:
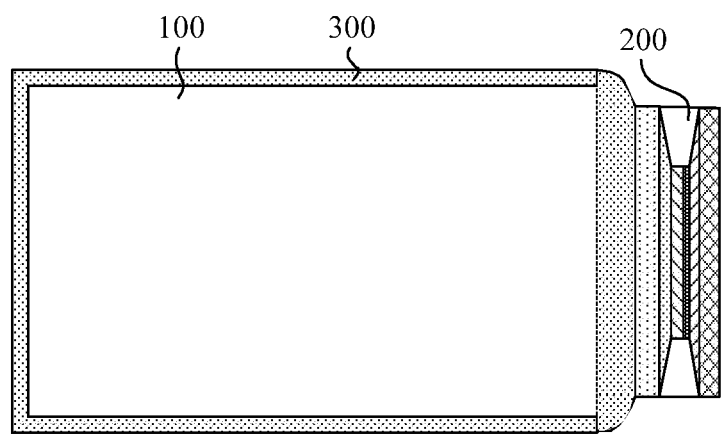
FIG. 2 is a schematic diagram of a structure of a display substrate.

FIG. 2 is a schematic diagram of a structure of a display substrate. As shown in FIG. 2, the display substrate may include a display area 100 and a non-display area located at a periphery of the display area 100. The non-display area may include a bonding area 200 located on a side of the display area 100 and a bezel area 300 located on other sides of the display area 100. In an exemplary implementation, the display area 100 may include multiple sub-pixels arranged in a matrix. A sub-pixel may include a pixel drive circuit and a light emitting device. The bonding area 200 may at least include an isolation dam and a bonding circuit that connects signal lines of multiple sub-pixels to an external driving apparatus. The bezel area 300 may include at least an isolation dam, a Gate Driver on Array (GOA for short), and a power supply line for transmitting voltage signals to the multiple sub-pixels. The bonding area 200 and the isolation dam of the bezel area 300 form an annular structure surrounding the display area 100.

Figure 3:
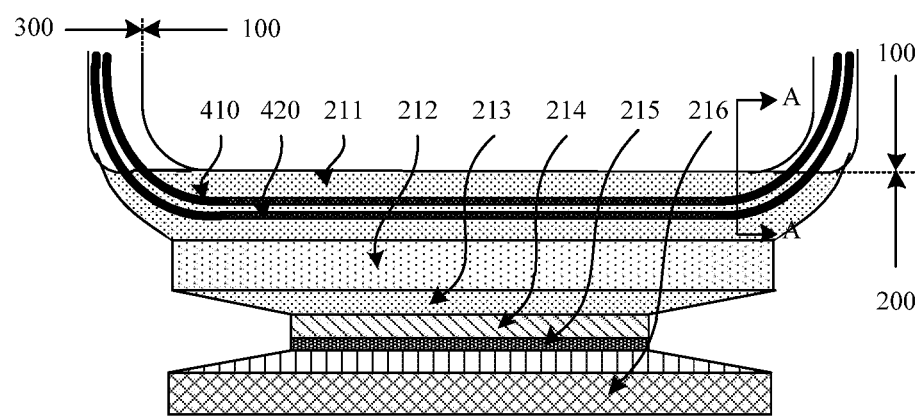
FIG. 3 is a schematic diagram of a structure of a bonding area and a bezel area in a display substrate.

FIG. 3 is a schematic diagram of a structure of a bonding area and a bezel area in a display substrate. As shown in FIG. 3, in an exemplary implementation, in a plane parallel to the display substrate, the bonding area 200 may be located on a side of a display area 100. The bonding area 200 may include a first fan-out region 211, a bending region 212, a second fan-out region 213, an anti-static region 214, a drive chip region 215, and a bonding pin region 216 that are arranged in sequence in a direction away from the display area 100. Among them, the first fan-out region 211 may at least include multiple data connection lines, multiple touch leads, a second power supply line, and a first power supply line. The multiple data connection lines are configured to be connected with data lines of the display area 100 in a fan-out wiring manner. The multiple touch leads are configured to be connected with touch electrodes of the display area 100. The first power supply line (VSS) is configured to be connected to a low voltage power supply line in the bezel area 300, and the second power supply line (VDD) is configured to be connected to a high voltage power supply line in the display area 100. The bending region 212 may include a composite insulating layer provided with a groove, and is configured to bend the bonding area 200 to a back of the display area 100. The second fan-out region 213 may include multiple data connection lines that are led out in a fan-out wiring manner. The anti-static region 214 may include an anti-static circuit, and is configured to prevent electrostatic damage to the display substrate by eliminating electrostatic. The drive chip region 215 may include an Integrated Circuit (IC for short), and is configured to be connected with multiple data connection lines. The bonding pin region 216 may include multiple bonding pads, and is configured to be bonded to and connected with an external Flexible Printed Circuit (FPC for short).

In an exemplary implementation, the isolation dam may include a first isolation dam 410 and a second isolation dam 420, wherein the first isolation dam 410 and the second isolation dam 420 may at least partially be disposed in the first fan-out region 211. The first isolation dam 410 and the second isolation dam 420 may extend in a direction parallel to an edge of the display area, wherein a distance between the first isolation dam 410 and the edge of the display area is smaller than a distance between the second isolation dam 420 and the edge of the display area, and the first isolation dam 410 and the second isolation dam 420 are configured to block an organic layer in an encapsulation structure layer to prevent the organic layer from flowing to the bending region.

In an exemplary implementation, in a plane parallel to the display substrate, the bezel area 300 may include a circuit region, an isolation dam region, and a crack dam region which are sequentially disposed in the direction away from the display area 100. Among them, the circuit region may at least include a gate drive circuit which is connected with a first scan line and a second scan line of a pixel drive circuit in the display area 100. The isolation dam region may at least include the first power supply line, the first isolation dam 410 and the second isolation dam 420. The first power supply line may extend in a direction parallel to the edge of the display area, and is connected with the first power supply line VSS of the pixel drive circuit in the display area 100. The first isolation dam 410 and the second isolation dam 420 extend in the direction parallel to the edge of the display area. The first isolation dam 410 and the second isolation dam 420 of the bezel area 300 are integrally constructed with the first isolation dam 410 and the second isolation dam 420 of the bonding area 200, and they are prepared synchronously through a same patterning process to form an annular structure surrounding the display area 100. The crack dam region includes multiple cracks provided on the composite insulating layer, wherein the multiple cracks are configured to reduce forces on the display area 100 and the circuit region during a cutting process, and cut off transmission of cracks towards the display area 100 and the circuit region, so as to avoid affecting film layer structures of the display area 100 and the circuit region.

Figure 4:
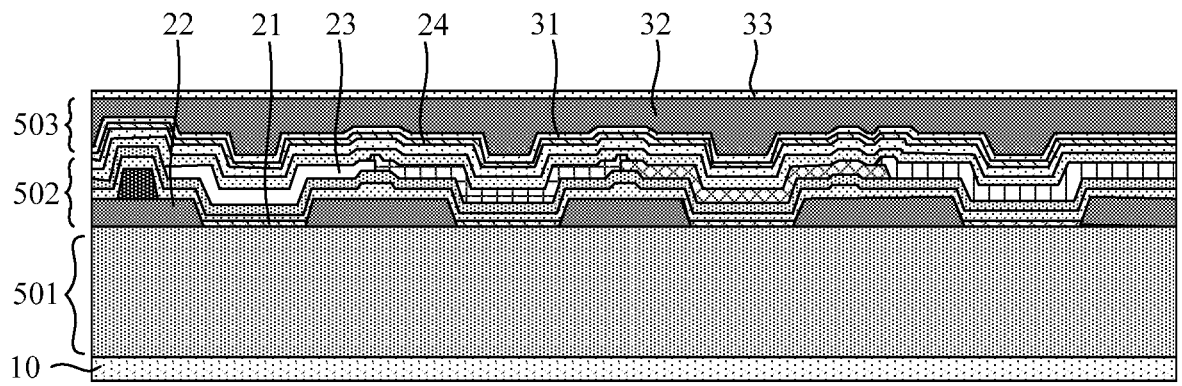
FIG. 4 is a schematic diagram of a sectional structure of a display area in a display substrate.

FIG. 4 is a schematic diagram of a sectional structure of a display area in a display substrate, illustrating a structure of four sub-pixels of the display area. As shown in FIG. 4, in a plane perpendicular to the display substrate, each sub-pixel in the display area may include a drive structure layer 501 disposed on a base substrate 10, a light emitting structure layer 502 disposed on a side of the drive structure layer 501 away from the base substrate 10, and an encapsulation structure layer 503 disposed on a side of the light emitting structure layer 502 away from the base substrate 10.

In an exemplary implementation, the drive structure layer 501 of each sub-pixel may include a pixel drive circuit composed of multiple transistors and a storage capacitor. In an exemplary implementation, the drive structure layer 501 may include: a first insulating layer disposed on a base substrate, a semiconductor layer disposed on the first insulating layer, a second insulating layer covering the semiconductor layer, a first gate metal layer disposed on the second insulating layer, a third insulating layer covering the first gate metal layer, a second gate metal layer disposed on the third insulating layer, a fourth insulating layer covering the second gate metal layer, a source-drain metal layer disposed on the fourth insulating layer and a planarization layer covering the source-drain metal layer. The semiconductor layer may at least include multiple transistors, the first gate metal layer may at least include gate electrodes of the multiple transistors and a first plate of the storage capacitor, the second gate metal layer may at least include a second plate of the storage capacitor, and the source-drain metal layer may at least include first electrodes and second electrodes of the multiple transistors.

In an exemplary implementation, the light emitting structure layer 502 of each sub-pixel may include a light emitting device formed by multiple film layers, wherein the multiple film layers may include an anode 21, a pixel definition layer 22, an organic light emitting layer 23, and a cathode 24. The anode 21 is connected with a pixel drive circuit. The organic light emitting layer 23 is connected with the anode 21. The cathode 24 is connected with the organic light emitting layer 23. The organic light emitting layer 23 emits light of a corresponding color under driving of the anode 21 and the cathode 24. The encapsulation structure layer 503 may include a first encapsulation layer 31, a second encapsulation layer 32, and a third encapsulation layer 33 which are stacked, wherein the first encapsulation layer 31 and the third encapsulation layer 33 may be made of an inorganic material, the second encapsulation layer 32 may be made of an organic material, and the second encapsulation layer 32 is disposed between the first encapsulation layer 31 and the third encapsulation layer 33, thus ensuring that external water vapor cannot enter the light emitting structure layer 502.

In an exemplary implementation, the display area may further include a touch structure layer, which may include: a buffer layer disposed on the third encapsulation layer, a first touch metal layer disposed on the buffer layer, a touch insulating layer covering the first touch metal layer, a second touch metal layer disposed on the touch insulating layer, and a touch protective layer covering the second touch metal layer.

Figure 5:
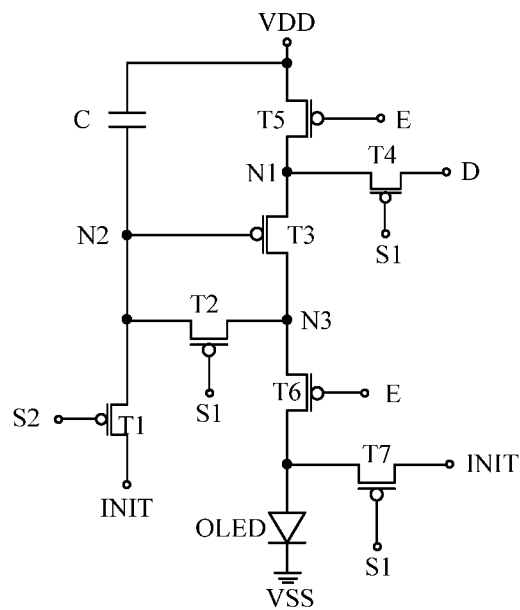
FIG. 5 is a schematic diagram of an equivalent circuit of a pixel drive circuit.

In an exemplary implementation, the pixel drive circuit may be in a 3T1C, 4T1C, 5T1C, 5T2C, 6T1C, or 7T1C structure. FIG. 5 is a schematic diagram of an equivalent circuit of a pixel drive circuit. As shown in FIG. 5, the pixel drive circuit may include seven transistors (a first transistor T1 to a seventh transistor T7), one storage capacitor C, and seven signal lines (a data signal line D, a first scan signal line S1, a second scan signal line S2, a light emitting signal line E, an initial signal line INIT, a first power supply line VSS, and a second power supply line VDD).

In an exemplary implementation, the pixel drive circuit may include a first node N1, a second node N2, and a third node N3. Herein, the first node N1 is respectively connected with a first electrode of the third transistor T3, a second electrode of the fourth transistor T4, and a second electrode of the fifth transistor T5. The second node N2 is respectively connected with a second electrode of the first transistor, a first electrode of the second transistor T2, a control electrode of the third transistor T3, and a second end of the storage capacitor C. The third node N3 is respectively connected with a second electrode of the second transistor T2, a second electrode of the third transistor T3, and a first electrode of the sixth transistor T6.

In an exemplary implementation, a first end of the storage capacitor C is connected with the second power supply line VDD, and the second end of the storage capacitor C is connected with the second node N2, namely the second end of the storage capacitor C is connected with the control electrode of the third transistor T3.

A control electrode of the first transistor T1 is connected with the second scan signal line S2, a first electrode of the first transistor T1 is connected with the initial signal line INIT, and the second electrode of the first transistor is connected with the second node N2. When a scan signal with a turn-on level is applied to the second scan signal line S2, the first transistor T1 transmits an initialization voltage to the control electrode of the third transistor T3 so as to initialize a charge amount of the control electrode of the third transistor T3.

A control electrode of the second transistor T2 is connected with the first scan signal line S1, the first electrode of the second transistor T2 is connected with the second node N2, and the second electrode of the second transistor T2 is connected with the third node N3. When a scan signal with a turn-on level is applied to the first scan signal line S1, the second transistor T2 enables the control electrode of the third transistor T3 to be connected with the second electrode of the third transistor T3.

The control electrode of the third transistor T3 is connected with the second node N2, namely the control electrode of the third transistor T3 is connected with the second end of the storage capacitor C, the first electrode of the third transistor T3 is connected with the first node N1, and the second electrode of the third transistor T3 is connected with the third node N3. The third transistor T3 may be called a drive transistor. The third transistor T3 determines a magnitude of a drive current that flows between the second power supply line VDD and the first power supply line VSS according to a potential difference between the control electrode and first electrode of the third transistor T3.

A control electrode of the fourth transistor T4 is connected with the first scan signal line S1, a first electrode of the fourth transistor T4 is connected with the data signal line D, and a second electrode of the fourth transistor T4 is connected with the first node N1. The fourth transistor T4 may be referred to as a switch transistor, a scan transistor, etc., and when a scan signal with a turn-on level is applied to the first scan signal line S1, the fourth transistor T4 enables a data voltage of the data signal line D to be input to the pixel drive circuit.

A control electrode of the fifth transistor T5 is connected to the emitting signal line E, a first electrode of the fifth transistor T5 is connected to the second power supply line VDD, and a second electrode of the fifth transistor T5 is connected to the first node N1. A control electrode of the sixth transistor T6 is connected with the light emitting signal line E, a first electrode of the sixth transistor T6 is connected with the third node N3, and a second electrode of the sixth transistor T6 is connected with a first electrode of a light emitting device OLED. The fifth transistor T5 and the sixth transistor T6 may be referred to as light emitting transistors. When a light emitting signal with a turn-on level is applied to the light emitting signal line E, the fifth transistor T5 and the sixth transistor T6 form a drive current path between the second power supply line VDD and the first power supply line VSS to cause the light emitting device to emit light.

A control electrode of the seventh transistor T7 is connected with the first scan signal line S1, a first electrode of the seventh transistor T7 is connected with the initial signal line INIT, and a second electrode of the seventh transistor T7 is connected with the first electrode of the light emitting device. When a scan signal with a turn-on level is applied to the first scan signal line S1, the seventh transistor T7 transmits an initialization voltage to the first electrode of the light emitting device so as to initialize a charge amount accumulated in the first electrode of the light emitting device or release a charge amount accumulated in the first electrode of the light emitting device.

In an exemplary implementation, a second electrode of the light emitting device is connected to the first power supply line VSS. A signal of the first power supply line VSS is a low-level signal. A signal of the second power supply line VDD is a high-level signal continuously provided. The first scan signal line S1 is a scan signal line in a pixel drive circuit of a current display row, and the second scan signal line S2 is a scan signal line in a pixel drive circuit of a previous display row. That is, for an n-th display row, the first scan signal line S1 is S(n), and the second scan signal line S2 is S(n−1). The second scan signal line S2 of the current display row and the first scan signal line S1 in the pixel drive circuit of the previous display row are a same signal line, thus signal lines of the display panel may be reduced, so that a narrow bezel of the display panel is achieved.

In an exemplary implementation, the first transistor T1 to the seventh transistor T7 may be P-type transistors or N-type transistors. Use of a same type of transistors in a pixel drive circuit may simplify a process flow, reduce process difficulties of a display panel, and improve a product yield. In some possible implementations, the first transistor T1 to the seventh transistor T7 may include a P-type transistor and an N-type transistor.

In an exemplary implementation, the first scan signal line S1, the second scan signal line S2, the light emitting signal line E, and the initial signal line INIT extend in a horizontal direction, and the first power supply line VSS, the second power supply line VDD, and the data signal line D extend in a vertical direction.

In an exemplary implementation, the light emitting device may be an organic light emitting diode (OLED), including a first electrode (anode), an organic light emitting layer, and a second electrode (cathode) that are stacked.

Figure 6:
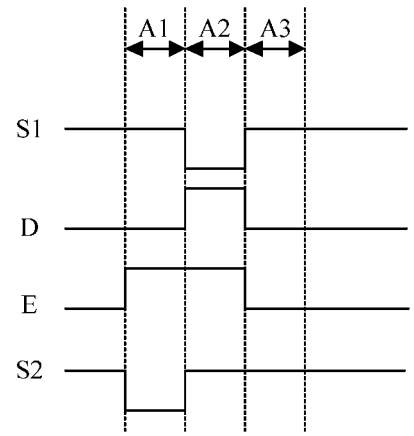
FIG. 6 is an operating timing diagram of a pixel drive circuit.

FIG. 6 is an operating timing diagram of a pixel drive circuit. An exemplary embodiment of the present disclosure will be described below through an operating process of the pixel drive circuit shown in FIG. 5. The pixel drive circuit in FIG. 5 includes seven transistors (a first transistor T1 to a seventh transistor T7), one storage capacitor C, and seven signal lines (a data signal line D, a first scan signal line S1, a second scan signal line S2, a light emitting signal line E, an initial signal line INIT, a second power supply line VDD, and a first power supply line VSS), wherein all of the seven transistors are P-type transistors.

In an exemplary implementation, the operating process of the pixel drive circuit may include following stages.

In a first stage A1, referred to as a reset stage, a signal of the second scan signal line S2 is a low-level signal, and signals of the first scan signal line S1 and the light emitting signal line E are high-level signals. The signal of the second scan signal line S2 is a low-level signal, so that the first transistor T1 is turned on, and a signal of the initial signal line INIT is supplied to a second node N2 to initialize the storage capacitor C to clear an original data voltage in the storage capacitor. The signals of the first scan signal line S1 and the light emitting signal line E are high-level signals, so that the second transistor T2, the fourth transistor T4, the fifth transistor T5, the sixth transistor T6, and the seventh transistor T7 are turned off. An OLED does not emit light in this stage.

In a second stage A2, referred to as a data writing stage or a threshold compensation stage, the signal of the first scan signal line S1 is a low-level signal, the signals of the second scan signal line S2 and the light emitting signal line E are high-level signals, and the data signal line D outputs a data voltage. In this stage, a second end of the storage capacitor C is at a low level, so the third transistor T3 is turned on. The signal of the first scan signal line S1 is a low-level signal, so that the second transistor T2, the fourth transistor T4, and the seventh transistor T7 are turned on. The second transistor T2 and the fourth transistor T4 are turned on, so that the data voltage outputted by the data signal line D is supplied to the second node N2 through the first node N1, the turned-on third transistor T3, a third node N3, and the turned-on second transistor T2, and the storage capacitor C is charged with a difference between the data voltage outputted by the data signal line D and a threshold voltage of the third transistor T3. A voltage at the second end (the second node N2) of the storage capacitor C is Vd−|Vth|, wherein Vd is the data voltage outputted by the data signal line D, and Vth is the threshold voltage of the third transistor T3. The seventh transistor T7 is turned on, so that an initialization voltage of the initial signal line INIT is supplied to a first electrode of the OLED to initialize (reset) the first electrode of the OLED and clear a pre-stored voltage therein, thereby completing initialization to ensure that the OLED does not emit light. The signal of the second scan signal line S2 is a high-level signal, so that the first transistor T1 is turned off. The signal of the light emitting signal line E is a high-level signal, so that the fifth transistor T5 and the sixth transistor T6 are turned off.

In a third stage A3, referred to as a light emitting stage, the signal of the light emitting signal line E is a low-level signal, and the signals of the first scan signal line S1 and the second scan signal line S2 are high-level signals. The signal of the light emitting signal line E is a low-level signal, so that the fifth transistor T5 and the sixth transistor T6 are turned on, and a power voltage outputted by the second power supply line VDD provides a drive voltage to the first electrode of the OLED through the turned-on fifth transistor T5, the third transistor T3, and the sixth transistor T6 to drive the OLED to emit light.

In a drive process of the pixel drive circuit, a drive current flowing through the third transistor T3 (drive transistor) is determined by a voltage difference between a gate electrode and a first electrode of the third transistor T3. The voltage of the second node N2 is Vdata−|Vth|, so the drive current of the third transistor T3 is as follows.

$$I=K^*(Vgs-Vth)^2=K^*[(Vdd-Vd+|Vth|)-Vth]^2=K^*[(Vdd-Vd)]^2$$

wherein I is the drive current flowing through the third transistor T3, i.e., a drive current for driving the OLED, K is a constant, Vgs is a voltage difference between the gate electrode and the first electrode of the third transistor T3, Vth is the threshold voltage of the third transistor T3, Vd is the data voltage outputted by the data signal line D, and Vdd is the power voltage outputted by the second power supply line VDD.

Long range uniformity (LRU) is an index that characterizes a difference of display brightness in different areas under 255 gray scale in a panel, and is an important parameter for evaluating display quality. LRU is often evaluated by a "9-point method" and a "135-point method". For example, for the "9-point method", a ratio between a minimum value and a maximum value of brightness of nine points specified in a panel is used for evaluating uniformity, wherein the closer the ratio is to 1, the better the uniformity is. LRU is positively correlated with RC Loading of a panel, and the greater the loading is, the poorer the uniformity is. With the development of AMOLED, customers are putting more and more stringent requirements on LRU; moreover, display products are developing towards large size, so panel loading is increasing continuously. How to effectively reduce the panel loading is particularly important.

A voltage (VSS) required by the pixel drive circuit in the display area 100 is introduced from a bonding pad of the bonding area 200, enters the bezel area 300 after passing through bonding area 200, and is transmitted to the first power supply line VSS of each pixel drive circuit through an annular power supply line of the bezel area 300. Since there is certain impedance in the power supply line and there is a voltage drop in voltage signal transmission, a voltage of the power supply line far away from the bonding area 200 will be lower than the voltage of the power supply line close to the bonding area 200. The voltage loss of the power supply line reduces uniformity of display brightness in the display area, which has become an important factor affecting high-quality display.

In order to improve the uniformity of display brightness, the present disclosure provides a display substrate, wherein on a plane perpendicular to the display substrate, the display substrate includes a source-drain metal layer located on a base substrate, an insulating layer located on the source-drain metal layer and a touch metal layer located on the insulating layer, the source-drain metal layer includes a first wiring, the touch metal layer includes a second wiring, there is an overlapping area between an orthographic projection of the first wiring on the base substrate and an orthographic projection of the second wiring on the base substrate, and the first wiring and the second wiring form a double-layer wiring structure.

In some exemplary embodiments, as shown in FIG. 7a to FIG. 7g, on a plane parallel to the display substrate, the display substrate includes a display area 100, a bonding area 200 located on a side of the display area 100, and a bezel area 300 located on other sides of the display area 100.

On a plane perpendicular to the display substrate, the display substrate includes a source-drain metal layer located on a base substrate 10, an insulating layer located on the source-drain metal layer, and a touch metal layer located on the insulating layer, the source-drain metal layer includes a first power supply line VSS, the touch metal layer includes a first auxiliary power supply line 506, the first power supply line VSS is located in the bezel area 300 and a first fan-out region and extends from the first fan-out region 211 to the bonding pin region 216, the first auxiliary power supply line 506 is located in the bezel area 300 and the first fan-out region 211, and there is an overlapping area between an orthographic projection of the first power supply line VSS on the base substrate 10 and an orthographic projection of the first auxiliary power supply line 506 on the base substrate 10. The first power supply line VSS and the first auxiliary power supply line 506 are electrically connected through a groove or a via hole penetrating the insulating layer.

In the display substrate according to the embodiment of the present disclosure, by making the first power supply line VSS and the first auxiliary power supply line 506 form a double-layer wiring structure, a wiring resistance is reduced, thereby the panel's loading is reduced and the panel's uniformity is improved.

Figure 12A:
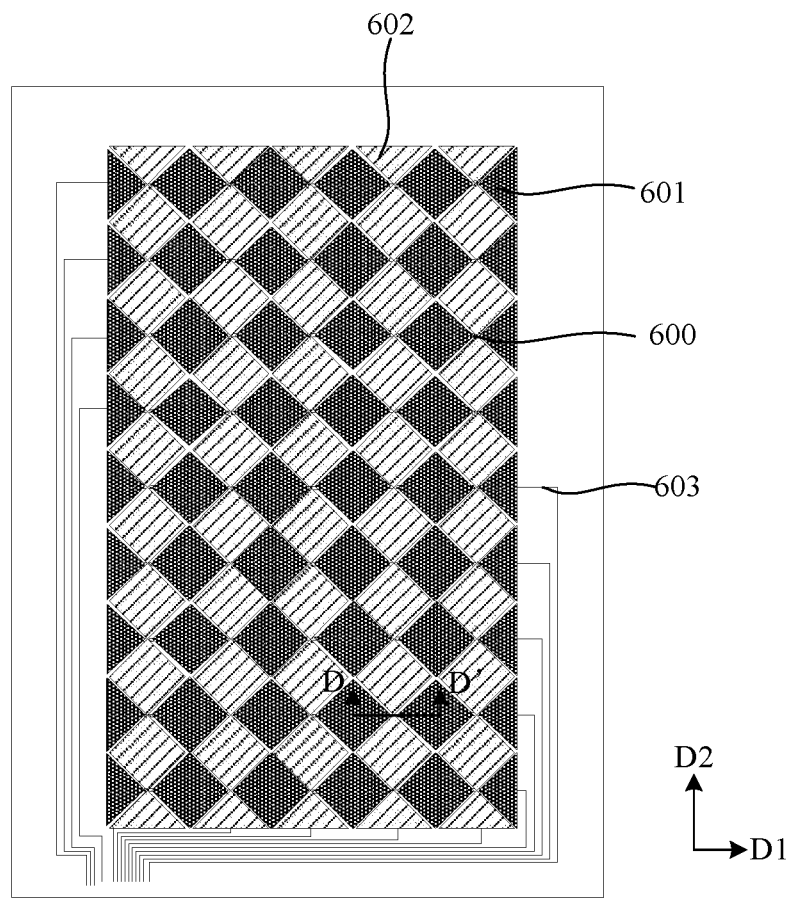
FIG. 12a is a schematic diagram of a planar structure of a touch electrode and a touch lead after a pattern of a second touch metal layer is formed according to an exemplary embodiment of the present disclosure.
Figure 12B:
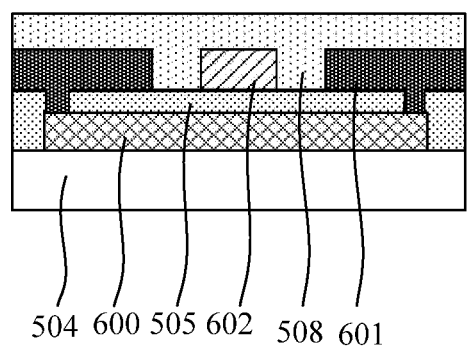
Figure 12C:
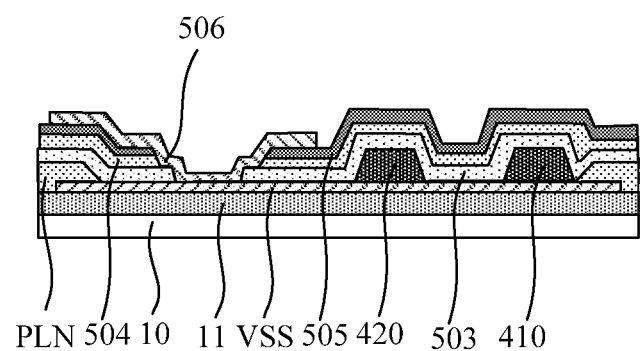
FIG. 12c and FIG. 12d are schematic diagrams of structures of a first groove region and a second groove region after a pattern of a second touch metal layer is formed according to an exemplary embodiment of the present disclosure.
Figure 12D:
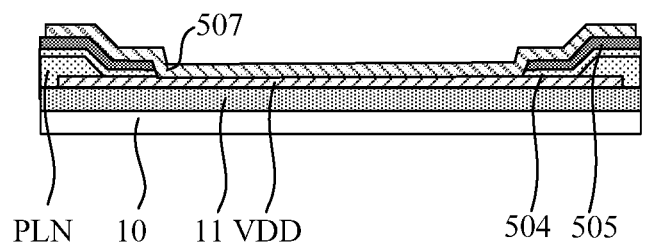

In an exemplary embodiment, as shown in FIG. 12*a* and FIG. 12*b*, the touch metal layer includes a first touch metal layer and a second touch metal layer, the first touch metal layer includes connection bridges 600, the second touch metal layer includes a first electrode and a second electrode. The first electrode includes multiple first sub-electrodes 601 arranged in a first direction D1, and in the first direction D1, two adjacent first sub-electrodes 601 are electrically connected with one connection bridge 600 through a via hole. The second electrode includes multiple second sub-electrodes 602 arranged in a second direction D2, and in the second direction D2, two adjacent second sub-electrodes 602 are connected to each other, the first direction D1 intersecting the second direction D2.

In some other exemplary embodiments, it is also feasible to dispose the connection bridges 600 in the second touch metal layer, and dispose the first electrode and the second electrode in the first touch metal layer, which is not limited in the present disclosure.

In an exemplary embodiment, the first electrode may be a drive electrode and the second electrode may be a sensing electrode; or, the first electrode may be a sensing electrode and the second electrode may be a drive electrode, which is not limited in the present disclosure.

In an exemplary embodiment, the first electrode and the second electrode are each formed by a metal mesh structure. In an exemplary embodiment, patterns of the metal meshes of the first electrode and the second electrode are the same. The patterns of the metal meshes being the same means that metal wires of the metal meshes have a same trend and a same line width.

In an exemplary embodiment, manufacturing materials of the first electrode and the second electrode may be at least one of copper (Cu), silver (Ag), aluminum (Al), titanium (Ti) or nickel (Ni), which is not limited in the embodiments of the present disclosure.

In the embodiment, a metal mesh is used as the touch electrode. Compared with an indium tin oxide material in related technologies, a metal material has better ductility and is not prone to breakage. Thus, bending performance of the touch display substrate may be improved to make the touch substrate more suitable for achieving a flexible touch function, and cost may also be reduced. Moreover, the first electrode and the second electrode are arranged in a same layer and made of a same material, and have a same pattern, so that the base substrate 10 is fully arranged with metal meshes with a same pattern, which may solve the problems of poor shadow elimination and optical moire caused by mutual interference of metal meshes in different layers due to differences in line width and the like, and has better shadow elimination effect.

In an exemplary embodiment, each connection bridge 600 may be of a metal mesh structure and the number of connection bridges 600 is limited according to actual needs, which is not limited in the embodiments of the present disclosure.

In this embodiment, a metal mesh is used as the connection bridge. Compared with the indium tin oxide material in the related technologies, a metal material has better ductility and is not prone to breakage. Thus, bending performance of the touch display substrate may be improved to make the touch substrate more suitable for achieving a flexible touch function, cost may also be reduced, and the problem of shadow elimination caused by use of solid metal is avoided.

Figure 7A:
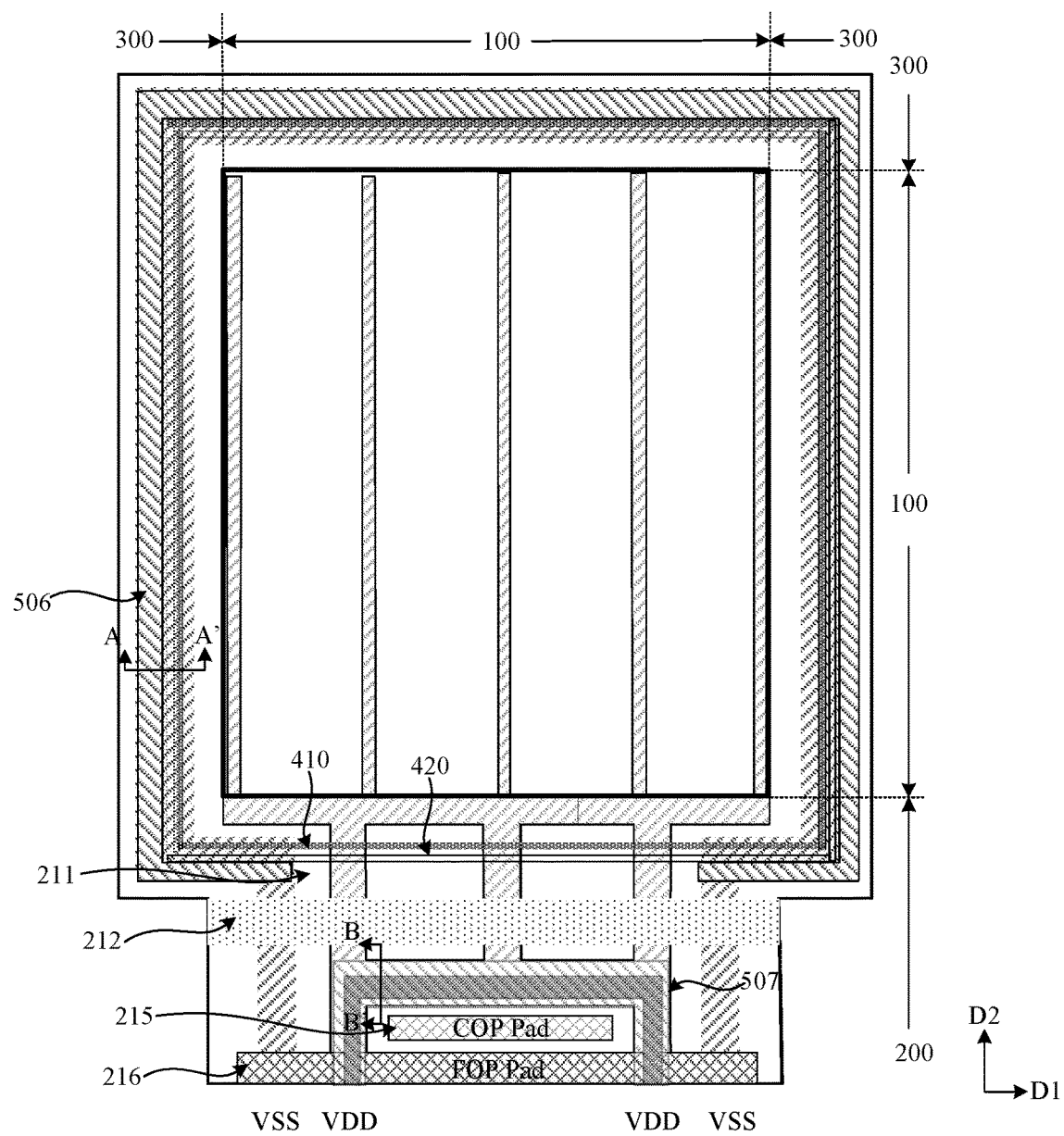
FIG. 7a is a schematic diagram of a planar structure of a display substrate according to an exemplary embodiment of the present disclosure.
Figure 7B:
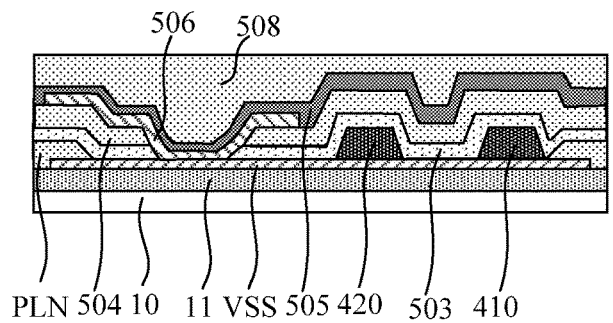
Figure 7C:
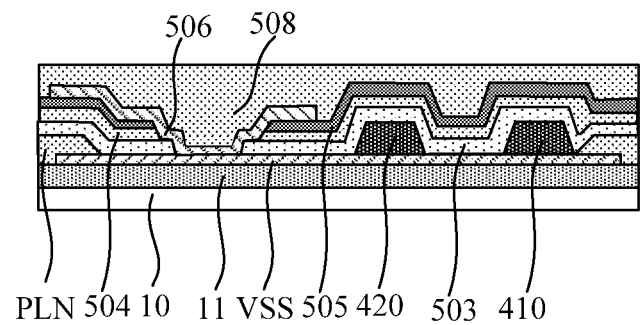
Figure 7D:
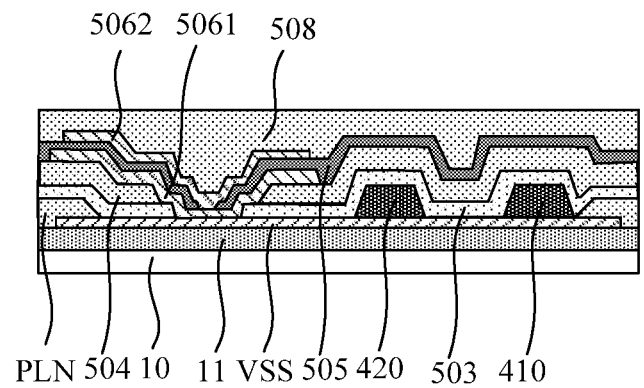
Figure 7E:
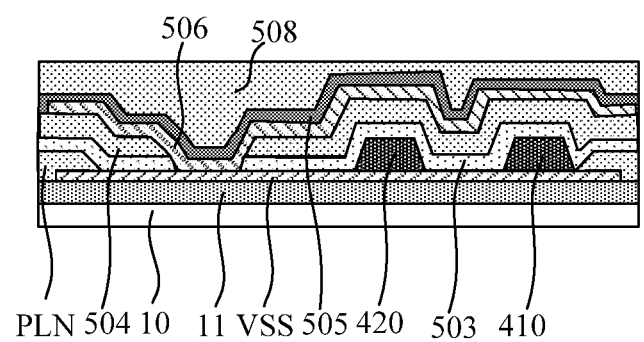

In an exemplary embodiment, as shown in FIG. 7*b* and FIG. 7*e*, the first auxiliary power supply line 506 is disposed in a same layer as the first touch metal layer, an encapsulation structure layer 503 and a buffer layer 504 are disposed between the first touch metal layer and the source-drain metal layer, and the first power supply line VSS and the first auxiliary power supply line 506 are electrically connected through a groove or a via hole penetrating the encapsulation structure layer 503 and the buffer layer 504. As shown in FIG. 7*b* to FIG. 7*e*, since the groove or via hole is located on a side of the isolation dam away from the display area, the encapsulation structure layer through which the groove or via hole penetrates includes a first encapsulation layer and a third encapsulation layer which are stacked, i.e., a laminated structure of inorganic material/inorganic material, excluding a second encapsulation layer.

In an exemplary embodiment, the groove includes a fourth groove (not shown in figures) that penetrates the buffer layer 504 and the encapsulation structure layer 503; or, the via hole includes a sixth via hole (not shown in figures) that penetrates the buffer layer 504 and the encapsulation structure layer 503.

In some exemplary embodiments, the bezel area 300 includes a first isolation dam 410 and a second isolation dam 420, wherein the first isolation dam 410 and the second isolation dam 420 are each disposed around the display area 100, and a distance between the first isolation dam 410 and the display area 100 is smaller than a distance between the second isolation dam 420 and the display area 100.

In an exemplary embodiment, an orthographic projection of the fourth groove (or the sixth via hole) on the base substrate 10 does not overlap with orthographic projections of the first isolation dam and the second isolation dam on the base substrate 10, and a distance between the fourth groove (or the sixth via hole) and the display area 100 is greater than a distance between the second isolation dam and the display area 100.

Figure 7F:
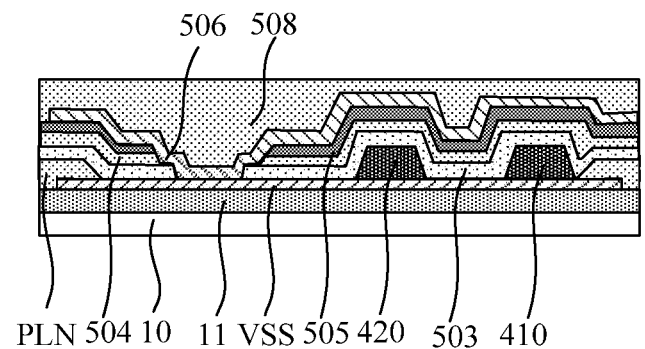

In an exemplary embodiment, as shown in FIG. 7*c* and FIG. 7*f*, the first auxiliary power supply line 506 is disposed in a same layer as the second touch metal layer. An encapsulation structure layer 503, a buffer layer 504 and a touch insulating layer 505 are disposed between the second touch metal layer and the source-drain metal layer, and the first power supply line VSS and the first auxiliary power supply line 506 are electrically connected through a groove or a via hole penetrating the encapsulation structure layer 503, the buffer layer 504 and the touch insulating layer 505.

In an exemplary embodiment, the groove includes a first groove (not shown in figures) and a third groove (not shown in figures), the first groove penetrates the touch insulating layer 505 and the buffer layer 504, and the third groove penetrates the encapsulation structure layer 503; or, the via hole includes a third via hole (not shown in figures) and a fifth via hole (not shown in figures), the third via hole penetrates the touch insulating layer 505 and the buffer layer 504, and the fifth via hole penetrates the encapsulation structure layer 503.

In an exemplary embodiment, an orthographic projection of the first groove on the base substrate 10 covers an orthographic projection of the third groove on the base substrate 10; or, an orthographic projection of the third via hole on the base substrate 10 covers an orthographic projection of the fifth via hole on the base substrate 10.

In an exemplary embodiment, the orthographic projection of the first groove (or the third via hole) on the base substrate 10 does not overlap with the orthographic projections of the first isolation dam 410 and the second isolation dam 420 on the base substrate 10, and the distance between the first groove (or the third via hole) and the display area 100 is greater than the distance between the second isolation dam 420 and the display area 100.

Figure 7G:
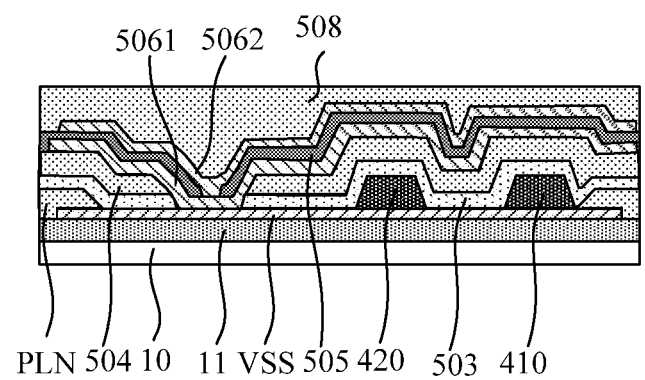

In an exemplary embodiment, as shown in FIG. 7d and FIG. 7g, the first auxiliary power supply line 506 includes a first sub-wiring 5061 and a second sub-wiring 5062. The first sub-wiring 5061 is arranged in a same layer as the first touch metal layer, the second sub-wiring 5062 is arranged in a same layer as the second touch metal layer, an encapsulation structure layer 503 and a buffer layer 504 are arranged between the first touch metal layer and the source-drain metal layer. A touch insulating layer 505 is disposed between the first touch metal layer and the second touch metal layer, the first power supply line VSS and the first sub-wiring 5061 are electrically connected through a groove or a via hole penetrating the encapsulation structure layer 503 and the buffer layer 504, and the first sub-wiring 5061 and the second sub-wiring 5062 are electrically connected through a groove or a via hole penetrating the touch insulating layer 505.

In an exemplary embodiment, the groove includes a fourth groove (not shown in figures) that penetrates the buffer layer 504 and the encapsulation structure layer 503; or, the via hole includes a sixth via hole (not shown in figures) that penetrates the buffer layer 504 and the encapsulation structure layer 503.

The groove further includes a fifth groove (not shown in figures) that penetrates the touch insulating layer 505; or, the via hole includes a seventh via hole (not shown in figures) that penetrates the touch insulating layer 505.

In an exemplary embodiment, an orthographic projection of the fourth groove (or the sixth via hole) on the base substrate 10 does not overlap with the orthographic projections of the first isolation dam 410 and the second isolation dam 420 on the base substrate 10, and a distance between the fourth groove (or the sixth via hole) and the display area 100 is greater than a distance between the second isolation dam 420 and the display area 100.

The orthographic projection of the fifth groove (or the seventh via hole) on the base substrate 10 does not overlap with the orthographic projections of the first isolation dam and the second isolation dam on the base substrate 10, and a distance between the fifth groove (or the seventh via hole) and the display area 100 is greater than the distance between the second isolation dam and the display area 100.

In an exemplary embodiment, the orthographic projection of the fourth groove on the base substrate 10 covers the orthographic projection of the fifth groove on the base substrate 10; or, the orthographic projection of the sixth via hole on the base substrate 10 covers the orthographic projection of the seventh via hole on the base substrate 10.

In some exemplary embodiments, as shown in FIG. 7b to FIG. 7d, an orthographic projection of the first auxiliary power supply line 506 on the base substrate 10 does not overlap with the orthographic projections of the first isolation dam 410 and the second isolation dam 420 on the base substrate 10, and a distance between the first auxiliary power supply line 506 and the display area 100 is greater than the distance between the second isolation dam 420 and the display area 100.

In some other exemplary embodiments, as shown in FIG. 7e to FIG. 7g, the orthographic projection of the first auxiliary power supply line 506 on the base substrate 10 covers the orthographic projections of the first isolation dam 410 and the second isolation dam 420 on the base substrate 10.

In some exemplary embodiments, as shown in FIG. 7b to FIG. 7g, the source-drain metal layer includes a single-layered source-drain metal layer.

In some other exemplary embodiments, the source-drain metal layer includes a first source-drain metal layer and a second source-drain metal layer (not shown in figures).

The first power supply line VSS may be arranged in a same layer as the first source-drain metal layer; or
  the first power supply line VSS may be arranged in a same layer as the second source-drain metal layer; or
  the first power supply line VSS may include a third sub-wiring and a fourth sub-wiring, the third sub-wiring is arranged in a same layer as the first source-drain metal layer and the fourth sub-wiring is arranged in a same layer as the second source-drain metal layer.

In order to improve the uniformity of display brightness, the present disclosure further provides a display substrate. As shown in FIG. 7a and FIG. 7h to FIG. 7j, on a plane parallel to the display substrate, the display substrate includes a display area 100, and a bonding area 200 located on a side of the display area 100, wherein the bonding area 200 sequentially includes a first fan-out region 211, a bending region 212, a drive chip region 215 and a bonding pin region 216 in a direction away from the display area 100.

On a plane perpendicular to the display substrate, the display substrate includes a source-drain metal layer located on the base substrate 10, an insulating layer located on the source-drain metal layer, and a touch metal layer located on the insulating layer. The source-drain metal layer includes a second power supply line VDD, the touch metal layer includes a second auxiliary power supply line 507, the second power supply line VDD is located in the display area 100 and the first fan-out region 211, and extends from the first fan-out region 211 to the bonding pin region 216, the second auxiliary power supply line 507 is located in the bonding area 200 and located on a side of the bending region 212 away from the display area 100, and there is an overlapping area between an orthographic projection of the second power supply line VDD on the base substrate 10 and an orthographic projection of the second auxiliary power supply line 507 on the base substrate 10.

The second power supply line VDD and the second auxiliary power supply line 507 are electrically connected through a groove or a via hole penetrating the insulating layer.

In the display substrate according to the embodiment of the present disclosure, by making the second power supply line VDD and the second auxiliary power supply line 507 form a double-layer wiring structure, a wiring resistance is reduced, thereby the panel's loading is reduced and the panel's uniformity is improved.

In some exemplary embodiments, the display substrate may employ only the first power supply line VSS and the first auxiliary power supply line 506 to form a double-layer wiring structure. In some other exemplary embodiments, the display substrate may employ only the second power supply line VDD and the second auxiliary power supply line 507 to form a double-layer wiring structure. In some further exemplary embodiments, the display substrate may employ the first power supply line VSS and the first auxiliary power supply line 506 to form a double-layer wiring structure, and the second power supply line VDD and the second auxiliary power supply line 507 form a double-layer wiring structure, which is not limited in the present disclosure.

Figure 7H:
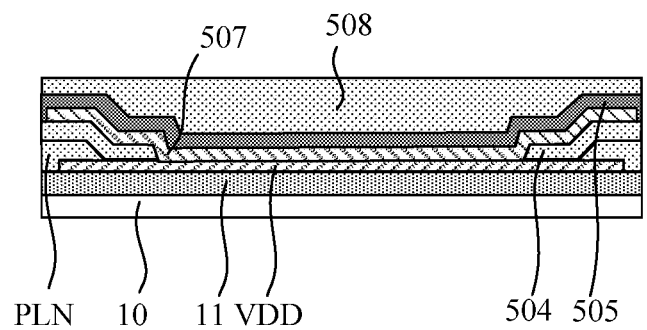

In an exemplary embodiment, as shown in FIG. 7h, the second auxiliary power supply line 507 is disposed in a same layer as the first touch metal layer, a buffer layer 504 is disposed between the first touch metal layer and the source-drain metal layer, and the second power supply line VDD and the second auxiliary power supply line 507 are electrically connected through a groove or a via hole penetrating the buffer layer 504.

Figure 7I:
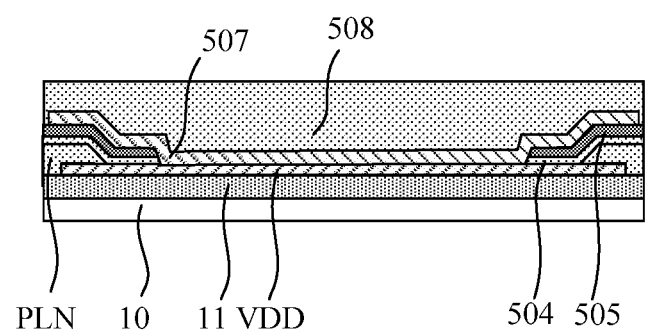

In an exemplary embodiment, as shown in FIG. 7i, the second auxiliary power supply line 507 is disposed in a same layer as the second touch metal layer, a buffer layer 504 and a touch insulating layer 505 are disposed between the second touch metal layer and the source-drain metal layer, and the second power supply line VDD and the second auxiliary power supply line are electrically connected through a groove or a via hole penetrating the buffer layer 504 and the touch insulating layer 505.

Figure 7J:
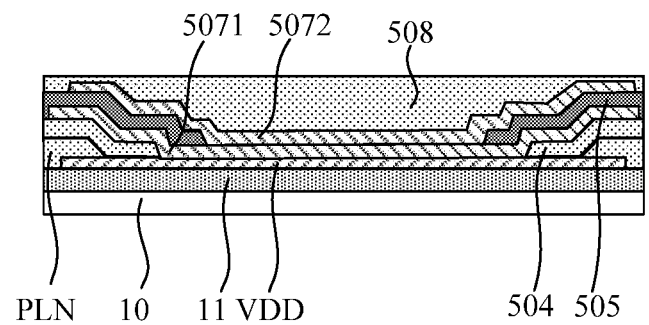

In an exemplary embodiment, as shown in FIG. 7j, the second auxiliary power supply line 507 includes a fifth sub-wiring 5071 and a sixth sub-wiring 5072. The fifth sub-wiring 5071 is arranged in a same layer as the first touch metal layer, the sixth sub-wiring 5072 is arranged in a same layer as the second touch metal layer. A buffer layer 504 is disposed between the first touch metal layer and the source-drain metal layer, the second power supply line VDD and the fifth sub-wiring 5071 are electrically connected through a groove or a via hole penetrating the buffer layer 504. A touch insulating layer 505 is disposed between the second touch metal layer and the first touch metal layer, and the fifth sub-wiring 5071 and the sixth sub-wiring 5072 are electrically connected through a groove or a via hole penetrating the touch insulating layer 505.

In an exemplary embodiment, as shown in FIG. 7a, on a side of the bending region 212 away from the display area 100, the second power supply line VDD includes a first transverse connection portion extending in a first direction D1 and a first longitudinal connection portion extending in a second direction D2. The second auxiliary power supply line 507 includes a second transverse connection portion extending in the first direction D1 and a second longitudinal connection portion extending in the second direction D2.

The first transverse connection portion and the second transverse connection portion are all arranged between the bending region 212 and the drive chip region 215, and there is an overlapping area between an orthographic projection of the first transverse connection portion on the base substrate 10 and an orthographic projection of the second transverse connection portion on the base substrate 10.

There is an overlapping area between an orthographic projection of the first longitudinal connection portion on the base substrate 10 and an orthographic projection of the second longitudinal connection portion on the base substrate 10.

In an exemplary embodiment, the first longitudinal connection portion includes multiple first branches and multiple second branches. The first branch extends from an end of the first transverse connection portion in the first direction D1 to the bonding pin region 216, the second branch extends from the first transverse connection portion to the display area, the second longitudinal connection portion extends from an end of the second transverse connection portion in the first direction D1 to the bonding pin region 216, and there is an overlapping area between an orthographic projection of the first branches on the base substrate 10 and an orthographic projection of the second longitudinal connection portion on the base substrate 10.

In an exemplary embodiment, the source-drain metal layer includes a first source-drain metal layer and a second source-drain metal layer.

The second power supply line VDD may be arranged in a same layer as the first source-drain metal layer; or
 the second power supply line VDD may be arranged in a same layer as the second source-drain metal layer; or,
 the second power supply line VDD may include a seventh sub-wiring and an eighth sub-wiring, the seventh sub-wiring is arranged in a same layer as the first source-drain metal layer, and the eighth sub-wiring is arranged in a same layer as the second source-drain metal layer.

Exemplary description is made below through a preparation process of a display substrate. A "patterning process" mentioned in the present disclosure includes coating with photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film prepared using a material on a base substrate through a process such as deposition or coating. If the "thin film" does not need a patterning process in an entire preparation process, the "thin film" may also be called a "layer". If the "thin film" needs a patterning process in an entire preparation process, it is called a "thin film" before the patterning process, and called a "layer" after the patterning process. The "layer" after the patterning process includes at least one "pattern". "A and B being disposed in a same layer" mentioned in the present disclosure means that A and B are formed simultaneously through a same patterning process, and a "thickness" of a film layer is a dimension of the film layer in a direction perpendicular to the display substrate. In an exemplary embodiment of the present disclosure, "an orthographic projection of B is within a range of an orthographic projection of A" means that a boundary of the orthographic projection of B falls within a range of a boundary of the orthographic projection of A, or the boundary of the orthographic projection of A overlaps with the boundary of the orthographic projection of B.

In an exemplary implementation, the display substrate includes a display area 100 and a non-display area located at a periphery of the display area 100. The non-display area may include a bonding area 200 located on a side of the display area 100 and a bezel area 300 located on other sides of the display area 100. A preparation process of the display substrate may include following operations.

(1) Patterns of a drive structure layer and a light emitting structure layer are sequentially formed on a base substrate. In an exemplary embodiment, the drive structure layer may include multiple gate lines and multiple data lines, wherein the multiple gate lines and the multiple data lines cross vertically to define multiple pixel units arranged in a matrix. Each pixel unit includes at least three sub-pixels, and each sub-pixel includes one or more Thin Film Transistors (TFTs). In this embodiment, one pixel unit may include three sub-pixels, i.e., a red sub-pixel R, a green sub-pixel G, and a blue sub-pixel B respectively. Of course, a solution of this embodiment is also applicable to a case where one pixel unit includes four sub-pixels (a red sub-pixel R, a green sub-pixel G, a blue sub-pixel B, and a white sub-pixel W).

In an exemplary implementation, the preparation process of the drive structure layer may include the following operations.

A first insulating thin film and a semiconductor thin film are sequentially deposited on the base substrate, and the semiconductor thin film is patterned by a patterning process to form a first insulating layer covering the entire base substrate and a pattern of a semiconductor layer disposed on the first insulating layer. The pattern of the semiconductor layer at least includes a first active layer.

Subsequently, a second insulating thin film and a first metal thin film are sequentially deposited, and the first metal thin film is by through a patterning process to form a second insulating layer covering the pattern of the semiconductor layer and a pattern of a first gate metal layer disposed on the second insulating layer. The pattern of the first gate metal layer at least includes a first gate electrode and a first capacitor electrode.

Subsequently, a third insulating thin film and a second metal thin film are sequentially deposited, and the second metal thin film is patterned by a patterning process to form a third insulating layer covering the first gate metal layer and a pattern of a second gate metal layer disposed on the third insulating layer. The pattern of the second gate metal layer at least includes a second capacitor electrode, wherein a position of the second capacitor electrode corresponds to a position of the first capacitor electrode.

Subsequently, a fourth insulating thin film is deposited, and patterns of multiple first via holes are formed by a patterning process. The fourth insulating layer, the third insulating layer and the second insulating layer in the first via holes are etched away to expose two ends of the first active layer.

Subsequently, a third metal thin film is deposited, and the third metal thin film is patterned by a patterning process to form a pattern of a source-drain metal layer on the fourth insulating layer. The pattern of the source-drain metal layer may include: a first source electrode and a first drain electrode, and a first power supply line VSS and a second power supply line VDD. The first power supply line VSS is located in the bezel area and surrounds the display area, the second power supply line VDD is located in the display area and electrically connected with multiple sub-pixels, the first power supply line VSS and the second power supply line VDD are led to the bonding area and correspondingly connected with corresponding bonding pins, and the first power supply line VSS and the second power supply line VDD are configured to be connected with a low voltage signal and a high voltage signal, respectively. The first source electrode and the first drain electrode are connected to the first active layer through the first via hole, respectively. In an exemplary embodiment, the source-drain metal layer may further include multiple bonding pins (FPC on Plastic Pad (FOP Pad)) located in a bonding pin region 216, multiple drive chip pins (Chip on Plastic Pad (COP Pad)) located in a drive chip region 215, an input-output wiring (since this input-output wiring is located in an Outer Lead Bonding (OLB) area on the display substrate, this input-output wiring may also be called an OLB wiring) located between the bonding pin region 216 and the drive chip region 215, etc. The multiple bonding pins at least include a first bonding power pin and a second bonding power pin, the first bonding power pin is electrically connected to the first power supply line VSS, and the second bonding power pin is electrically connected to the second power supply line VDD. In some other exemplary embodiments, the bonding pin and the drive chip pin may each be formed by multiple metal film layers, wherein the multiple metal film layers may include a gate metal layer (a first gate metal layer and/or a second gate metal layer), a source-drain metal layer (a first source-drain metal layer and/or a second source-drain metal layer), etc. The display substrate according to the embodiment of the present disclosure is described by taking the case as example where the source-drain metal layer only includes a one-layer structure. In some other exemplary embodiments, the source-drain metal layer may also include a two-layer structure, i.e., a first source-drain metal layer and a second source-drain metal layer. In such a case, the first power supply line VSS and the second power supply line VDD may be located in the first source-drain metal layer, and may also be located in the second source-drain metal layer, or located in both the first source-drain metal layer and the second source-drain metal layer, i.e., forming double-layer wiring.

Subsequently, a planarization thin film is coated, and the planarization thin film is patterned through a patterning process to form a planarization (PLN) layer. Patterns of a second via hole, a partition and a first dam foundation are formed on the planarization layer. The planarization layer in the second via hole is removed to expose a surface of a first drain electrode of a first transistor. The planarization layer in the partition is removed to expose a surface of the first power supply line VSS. The first dam foundation is formed on the first power supply line VSS in the partition.

So far, the pattern of the drive structure layer has been prepared on the base substrate. In an exemplary implementation, the first active layer, the first gate electrode, the first source electrode and the first drain electrode form a thin film transistor, and the first capacitor electrode and the second capacitor electrode form a storage capacitor. The thin film transistor may be in a bottom gate structure, and may also be in a top gate structure, may be an amorphous silicon (a-Si) thin film transistor, and may also be a low temperature polysilicon (LTPS) thin film transistor or an oxide thin film transistor, which is not limited here.

In an exemplary implementation, the preparation process of the light emitting structure layer may include the following operations.

A transparent conductive thin film is deposited on the base substrate on which the above patterns are formed, and the transparent conductive thin film is patterned through a patterning process to form a pattern of an anode. An anode of each sub-pixel is connected with a drain electrode of a thin film transistor in the sub-pixel through the second via hole on the planarization layer.

Subsequently, a pixel definition thin film is coated on the base substrate on which the above patterns are formed, and the pixel definition thin film is patterned through a patterning process to form patterns of a pixel definition layer (PDL), and a second dam foundation.

Subsequently, a thin film of an organic material is coated on the base substrate on which the above patterns are formed, and a pattern of a post spacer (PS) is formed through masking, exposure and development processes. The first dam foundation, the second dam foundation and the post spacer (PS) form an isolation dam (DAM) arranged around the display area. The isolation dam may include a first isolation dam 410 and a second isolation dam 420, and a distance between the first isolation dam 410 and the display area 100 is smaller than a distance between the second isolation dam 420 and the display area 100.

Subsequently, an organic light emitting layer and a cathode are sequentially formed on the base substrate on which the above patterns are formed. The organic light emitting layer is formed in a pixel opening in the display area to achieve connection between the organic light emitting layer and the anode. The organic light emitting layer may include a hole injection layer (HIL), a hole transport layer (HTL), a light emitting layer (EML), an electron transport layer (ETL) and an electron injection layer (EIL) which are stacked. Among them, the hole transport layer (HTL), the light emitting layer (EML), the electron transport layer (ETL) and the electron injection layer (EIL) are sequentially disposed on the hole injection layer.

Figure 8A:
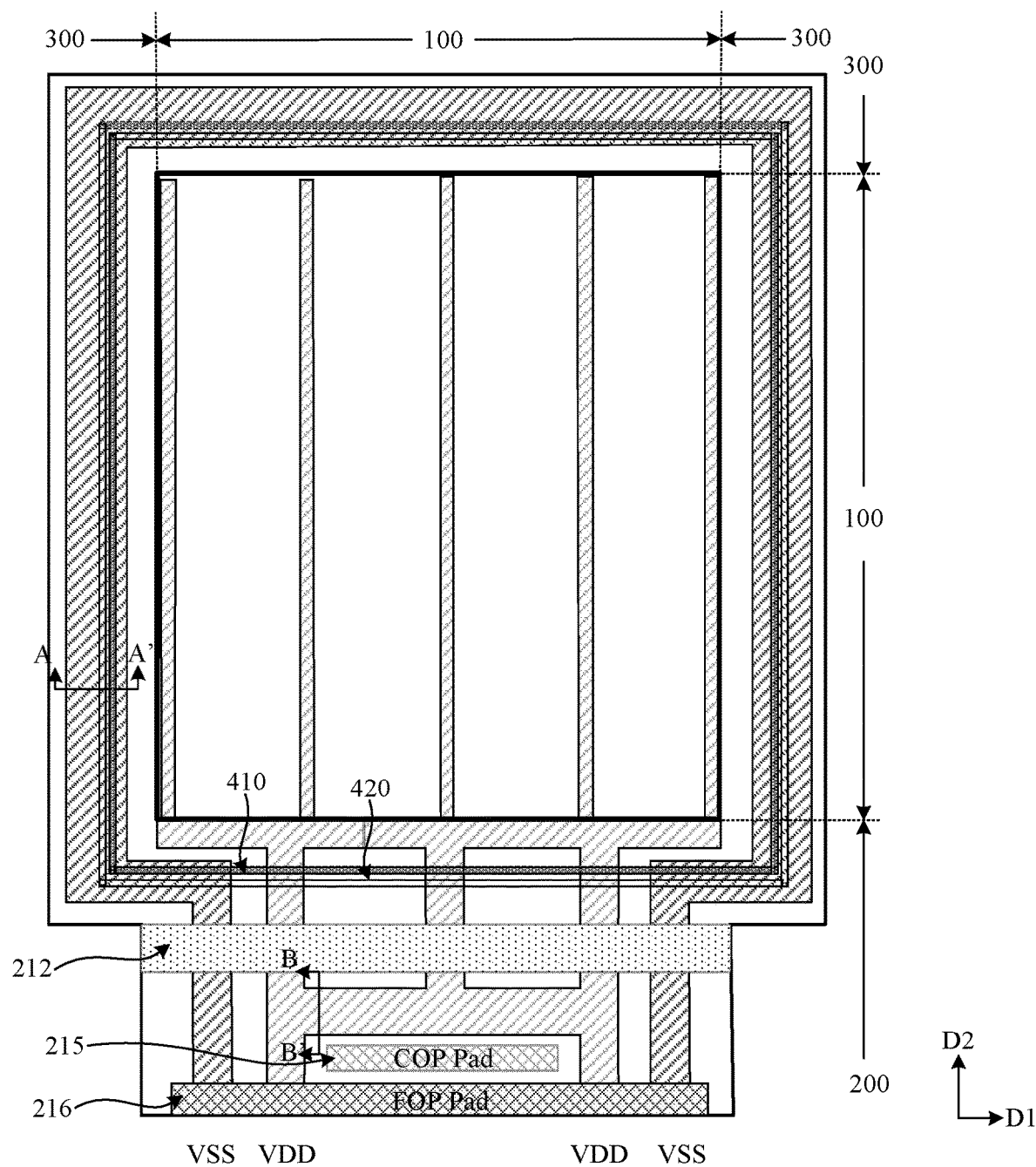
FIG. 8a is a schematic diagram after a pattern of a light emitting structure layer is formed according to an exemplary embodiment of the present disclosure.
Figure 8B:
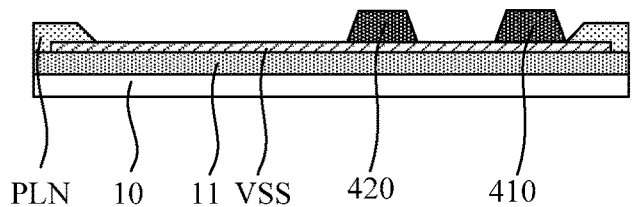
Figure 8C:
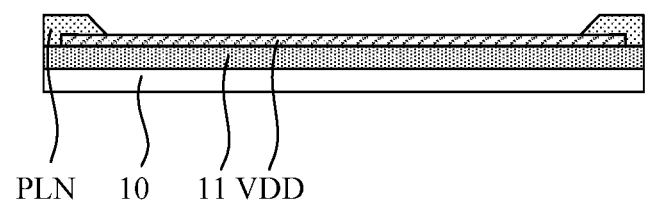

At this point, the pattern of the light emitting structure layer has been prepared on the base substrate, as shown in FIG. 8*a*, FIG. 8*b* and FIG. 8*c*, wherein FIG. 8*b* is a sectional view of A-A' area in FIG. 8*a*, and FIG. 8*c* is a sectional view of B-B' area in FIG. 8*a*, wherein 11 denotes a composite insulating layer, which may include the first insulating layer, the second insulating layer, the third insulating layer and the fourth insulating layer which are stacked on the base substrate 10. Since the organic light emitting layer is connected with the anode and the anode is connected with the drain electrode of the thin film transistor, thus connection between the organic light emitting layer and the drain electrode of the thin film transistor is achieved.

Figure 9:
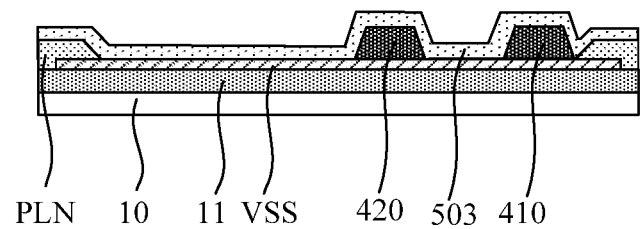
FIG. 9 is a schematic diagram after a pattern of an encapsulation structure layer is formed according to an exemplary embodiment of the present disclosure.

(2) A pattern of an encapsulation structure layer 503 is formed on a surface of the light emitting structure layer away from the base substrate, as shown in FIG. 9. In the display area and the circuit region of the bezel area, the encapsulation structure layer 503 includes a first encapsulation layer, a second encapsulation layer and a third encapsulation layer that are stacked, forming a laminated structure of inorganic material/organic material/inorganic material; and in the isolation dam region (i.e., a region where the first power supply line VSS is located) of the bezel area, the encapsulation structure layer includes the first encapsulation layer and the third encapsulation layer that are stacked, forming a laminated structure of inorganic material/inorganic material, which may further ensure encapsulation integrity and effectively isolate external water and oxygen. The bonding area 200 has no pattern of the encapsulation structure layer.

In an exemplary implementation, the first encapsulation layer and the third encapsulation layer may be made of any one or more of: silicon oxide (SiOx), silicon nitride (SiNx), and silicon oxynitride (SiON), and may be a single layer, multiple layers, or a composite layer, which may ensure that external water and oxygen cannot enter the light emitting structure layer. The second encapsulation layer may be made of an organic material, such as resin, etc., playing a role of covering each film layer of the display substrate so as to improve structural stability and flatness.

(3) Patterns of a buffer layer 504 and a first touch metal layer are sequentially formed on a surface of the encapsulation structure layer 503 away from the base substrate. A material of the buffer layer 504 may be any one or more of silicon oxide (SiOx), silicon nitride (SiNx), and silicon oxynitride (SiON), and the first touch metal layer may include multiple connection bridges (not shown in figures) disposed at intervals and first touch leads (not shown in figures), etc.

In an exemplary implementation, forming the pattern of the first touch metal layer may include: depositing a first conductive thin film on the base substrate, coating a layer of photoresist on the first conductive thin film, exposing and developing the photoresist by using a mask to form an unexposed region at a position of patterns of the connection bridges and the touch leads, in which the photoresist is retained, and form a fully exposed region at other positions, in which the photoresist is removed, and etching the conductive thin film in the fully exposed region and stripping the remaining photoresist, to form the pattern of the first touch metal layer. The first conductive thin film may be made of a metal material or a transparent conductive material, such as indium tin oxide (ITO), indium zinc oxide (IZO), carbon nanotubes or graphene, etc.

Figure 10A:
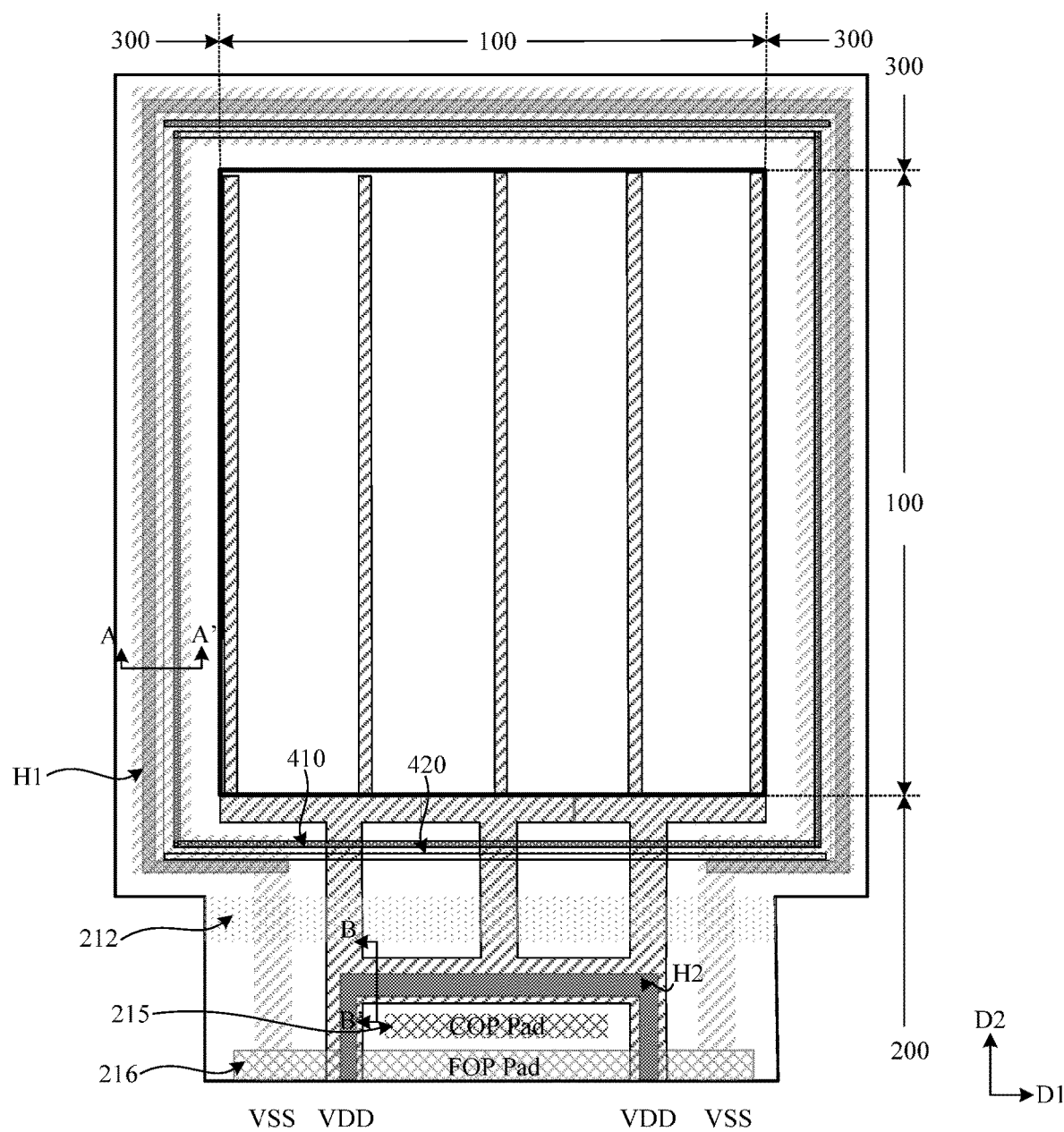
FIG. 10a is a schematic diagram after a pattern of a touch insulating layer is formed according to an exemplary embodiment of the present disclosure.
Figure 10B:
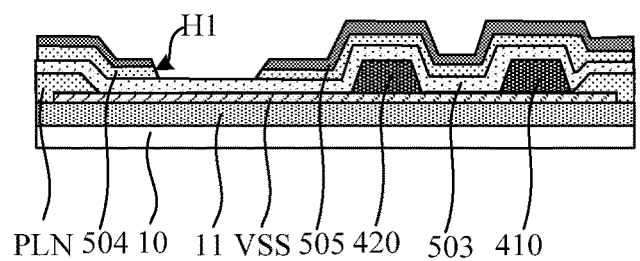
Figure 10C:
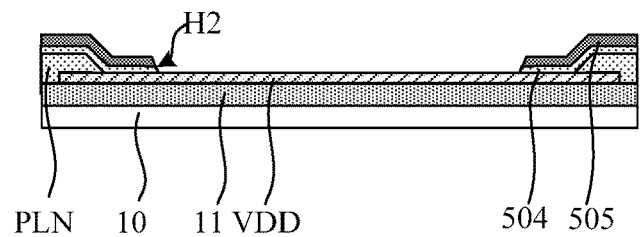

(4) A pattern of a touch insulating layer (TLD) 505 is formed on a surface of the first touch metal layer away from the base substrate 10, as shown in FIG. 10*a*, FIG. 10*b* and FIG. 10*c*, wherein FIG. 10*b* is a sectional view of A-A' area in FIG. 10*a*, and FIG. 10*c* is a sectional view of B-B' area in FIG. 10*a*, the touch insulating layer 505 may include eighth via holes (not shown in figures) and a ninth via hole (not shown in figures), the eighth via holes are located at two ends of the connection bridge, the touch insulating layer in the eighth via holes is etched away to expose the two ends of the connection bridge, which is used for electrical connection of a first sub-electrode to be formed subsequently with the connection bridge through the via hole; and the ninth via hole is located in the area where the first touch lead is located, and the touch insulating layer in the ninth via hole is etched away to expose the first touch lead, which is used for making the first touch lead and a second touch lead to be formed subsequently form a double-layer touch wire.

In an exemplary embodiment, the touch insulating layer 505 may further include a first groove H1. The first groove H1 is located in the bezel area 300 and the first fan-out region in the bonding area 200, there is an overlapping area between an orthographic projection of the first groove H1 on the base substrate and the orthographic projection of the first power supply line VSS on the base substrate, the orthographic projection of the first groove H1 on the base substrate does not overlap with the orthographic projections of the first isolation dam 410 and the second isolation dam 420 on the base substrate, and a distance between the first groove H1 and the display area is greater than the distance between the second isolation dam 420 and the display area. The touch insulating layer and the buffer layer in the first groove H1 are etched away to expose a surface of the encapsulation structure layer (part of the encapsulation structure layer may be etched away due to over-etching).

In some other exemplary embodiments, the first groove H1 may also be replaced by multiple discontinuous third via holes (not shown in figures), that is, the third via holes are located in the bezel area 300 and the first fan-out region in the bonding area 200, there is an overlapping area between an orthographic projection of the third via holes on the base substrate and the orthographic projection of the first power supply line VSS on the base substrate, the orthographic projection of the third via holes on the base substrate does not overlap with the orthographic projection of the first isolation dam 410 and the second isolation dam 420 on the base substrate, and a distance between the third via holes and the display area is greater than the distance between the second isolation dam 420 and the display area. The touch insulating layer and the buffer layer in the third via holes are etched away to expose a surface of the encapsulation structure layer (part of the encapsulation structure layer may be etched away due to over-etching).

In an exemplary embodiment, the touch insulating layer 505 may further include a second groove H2. The second groove H2 is located in the bonding area 200, the second groove H2 is located on a side of the bending region 212 away from the display area 100, there is an overlapping area between an orthographic projection of the second groove H2 on the base substrate and the orthographic projection of the second power supply line VDD on the base substrate, and the touch insulating layer and the buffer layer in the second groove H2 are etched away to expose a surface of the second power supply line VDD.

In some other exemplary embodiments, the second groove H2 may also be replaced by multiple discontinuous fourth via holes (not shown in figures), that is, the fourth via holes are located in the bonding area 200, the fourth via holes are located on a side of the bending region 212 away from the display area 100, there is an overlapping area between an orthographic projection of the fourth via holes on the base substrate and the orthographic projection of the second power supply line VDD on the base substrate, and the touch insulating layer and the buffer layer in the fourth via holes are etched away to expose a surface of the second power supply line VDD.

Figure 11A:
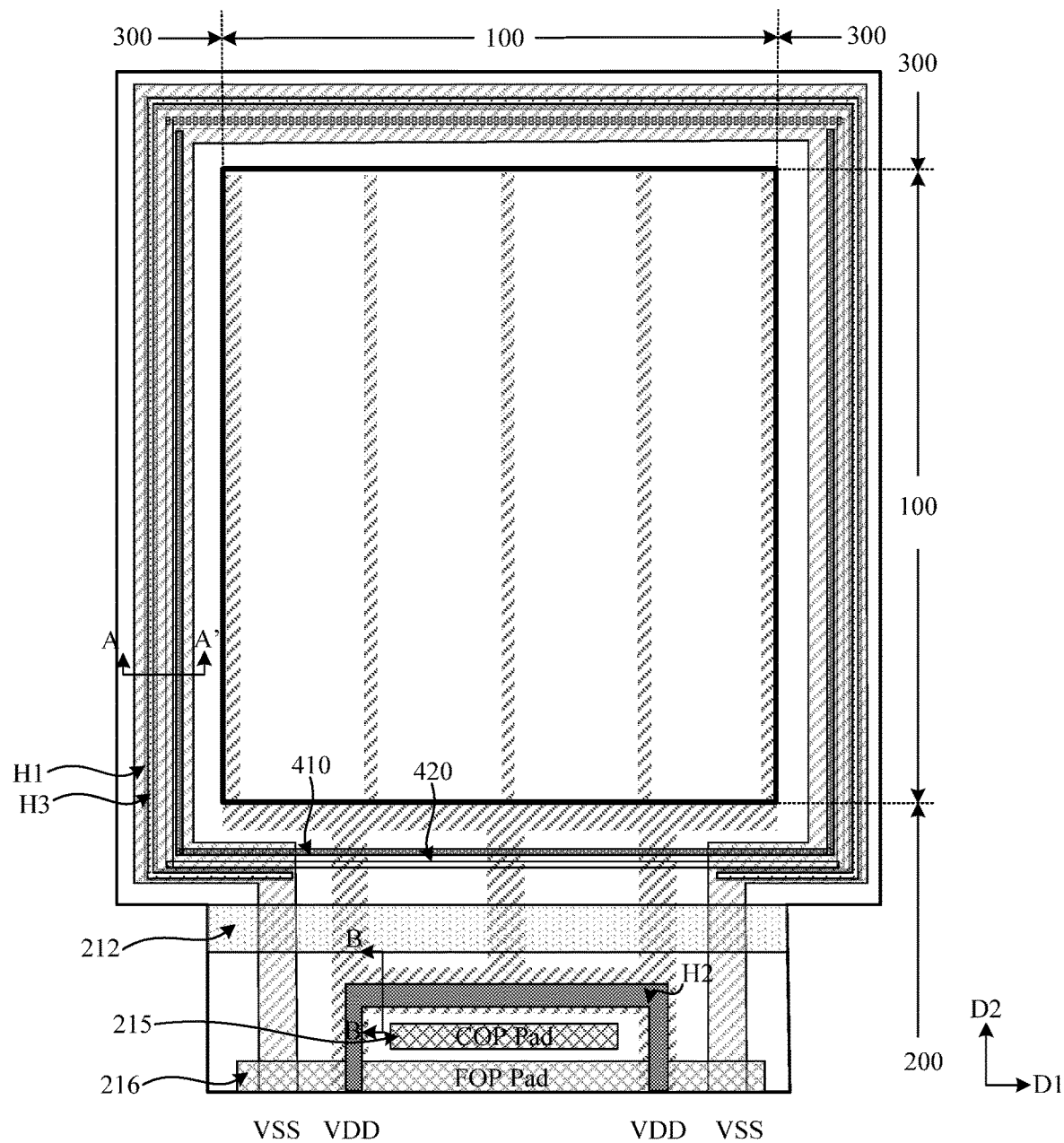
FIG. 11a is a schematic diagram after an encapsulation structure layer in a first groove is patterned according to an exemplary embodiment of the present disclosure.
Figure 11B:
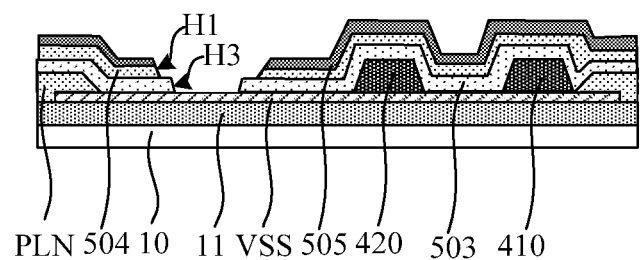

(5) A third groove H3 is formed on the encapsulation structure layer through a patterning process. An orthographic projection of the third groove H3 on the base substrate is within a range of the orthographic projection of the first groove H1 on the base substrate, and the encapsulation structure layer in the third groove H3 is etched away to expose a surface of the first power supply line VSS, as shown in FIG. 11*a* and FIG. 11*b*, wherein FIG. 11*b* is a sectional view of A-A' area in FIG. 11*a*.

In some other exemplary embodiments, the third groove H3 may also be replaced by multiple discontinuous fifth via holes (not shown in figures), that is, the fifth via holes are located in the bezel area 300 and the first fan-out region in the bonding area 200, an orthographic projection of the fifth via holes on the base substrate is within a range of the orthographic projection of the first groove H1 (or the third via holes) on the base substrate, and the encapsulation structure layer in the fifth via holes is etched away to expose a surface of the first power supply line VSS.

(6) A pattern of a second touch metal layer is formed on a surface of the touch insulating layer 505 away from the base substrate, as shown in FIG. 12*a* to FIG. 12*d*, the second touch metal layer may include patterns such as a first electrode, a second electrode and a second touch lead 603. The first electrode includes multiple first sub-electrodes 601 arranged in a first direction D1, and in the first direction D1, two adjacent first sub-electrodes 601 are electrically connected with one connection bridge 600 through the eighth via hole; and the second electrode includes multiple second sub-electrodes 602 arranged in a second direction D2, and in the second direction D2, two adjacent second sub-electrodes 602 are connected to each other, the first direction D1 intersecting the second direction D2.

In this embodiment, the first direction D1 and the second direction D2 are both perpendicular to a thickness direction of the encapsulation structure layer. Magnitude of an angle between the first direction D1 and the second direction D2 is not limited in the embodiments of the present application, for example, the first direction D1 and the second direction D2 may be perpendicular to each other.

In this embodiment, the first sub-electrode 601 and the second sub-electrode 602 are each in a mesh structure, at least one sub-pixel is arranged in the mesh, and the first sub-electrode 601 and the second sub-electrode 602 are both made of metal materials. Due to low resistance, good conductivity and high sensitivity of metal materials, transmission delays of electrical signals in the first sub-electrodes 601 and the second sub-electrodes 602 may be avoided, thus improving the touch effect. A shape of a mesh in the mesh structure may be a regular polygon or an irregular polygon.

In an exemplary implementation, the second touch metal layer may further include a first auxiliary power supply line 506. The first auxiliary power supply line 506 is located in the bezel area 300 and the first fan-out region in the bonding area 200, there is an overlapping area between an orthographic projection of the first auxiliary power supply line 506 on the base substrate and the orthographic projection of the first power supply line VSS on the base substrate, the orthographic projection of the first auxiliary power supply line 506 on the base substrate does not overlap with the orthographic projection of the first isolation dam 410 and the second isolation dam 420 on the base substrate. A distance between the first auxiliary power supply line 506 and the display area is greater than the distance between the second isolation dam 420 and the display area, and the first auxiliary power supply line 506 is electrically connected to the first power supply line VSS through the first groove H1 (or the third via hole) and the third groove H3 (or the fifth via hole).

In an exemplary implementation, the second touch metal layer may further include a second auxiliary power supply line 507. The second auxiliary power supply line 507 is located in the bonding area 200, the second auxiliary power supply line 507 is located on a side of the bending region 212 away from the display area 100, there is an overlapping area between an orthographic projection of the second auxiliary power supply line 507 on the base substrate and the orthographic projection of the second power supply line VDD on the base substrate, and the second auxiliary power supply line 507 is electrically connected to the second power supply line VDD through the second groove H2.

(7) A pattern of a protective layer 508 is formed on a surface of the second touch metal layer away from the base substrate, as shown in FIG. 7*c* and FIG. 7*i*. A material of the protective layer may be polyimide (PI), etc., which mainly plays a role of insulating and protecting for touch electrodes and peripheral wires.

In an exemplary implementation, during preparation of a flexible display substrate, the preparation process of the display substrate may further include processes such as stripping the base substrate, attaching a back film, and cutting, which is not limited in the present disclosure.

As can be seen from the structure of the display substrate and the preparation process thereof in the exemplary embodiments of the present disclosure, in an exemplary embodiment of the present disclosure, by forming the first groove H1, the third groove H3 and the first auxiliary power supply line 506, the first power supply line VSS and the first auxiliary power supply line 506 form a double-layer wiring structure, thereby reducing the wire resistance, thus reducing the panel loading and improving the panel uniformity. In addition, in an exemplary embodiment of the present disclosure, by forming the second groove H2 and the second auxiliary power supply line 507, the second power supply line VDD and the second auxiliary power supply line 507 also form a double-layer wiring structure, which also reduces the wire resistance, thereby reducing the panel's loading and improving the panel's uniformity. The preparation process of the display substrate in the exemplary embodiment of the present disclosure has good process compatibility, simple process achievement, easy implementation, a high production efficiency, a low production cost, and a high yield.

The structure of the display substrate and the preparation process thereof in the exemplary embodiments of the present disclosure are merely illustrative. In an exemplary implementation, a corresponding structure may be changed and patterning processes may be increased or reduced according to actual needs, which is not limited in the present disclosure.

Figure 13A:
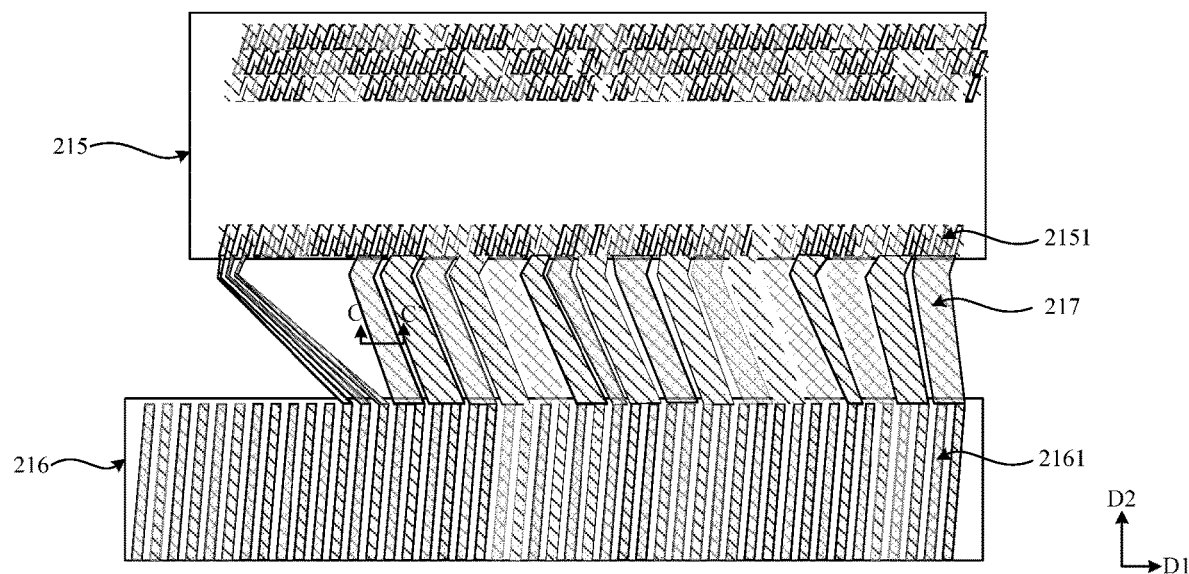
FIG. 13a is a schematic diagram of a planar structure of a bonding pin region and a drive chip pin region in a display substrate according to an exemplary embodiment of the present disclosure.

FIG. 13a is a schematic diagram of a structure of another display substrate according to an exemplary embodiment of the present disclosure, and FIG. 13b to FIG. 13e are several sectional views of C-C' area in FIG. 13a. In an exemplary implementation, the display substrate includes a display area, and a bonding area located on a side of the display area, the bonding area includes a drive chip region 215, a bonding pin region 216, and an input-output wiring 217 located between the drive chip region 215 and the bonding pin region 216. The drive chip region 215 includes a drive chip pin 2151, the bonding pin region 216 includes a bonding pin 2161, and the input-output wiring 217 is connected to the drive chip pin 2151 and the bonding pin 2161;
- the input-output wiring 217 includes a first input-output wiring 2171 and a second input-output wiring 2172, there is an overlapping area between an orthographic projection of the first input-output wiring 2171 on the base substrate 10 and an orthographic projection of the second input-output wiring 2172 on the base substrate 10;
- on a plane perpendicular to the display substrate, the display substrate includes a source-drain metal layer and a touch metal layer located on the base substrate 10, the first input-output wiring 2171 is disposed in a same layer as the source-drain metal layer, and the second input-output wiring 2172 is disposed in a same layer as the touch metal layer.

In an exemplary embodiment of the present disclosure, by making the first input-output wiring 2171 and the second input-output wiring 2172 form a double-layer wiring structure, the wire resistance is reduced, thereby reducing panel's loading and improving panel's uniformity.

Figure 13B:
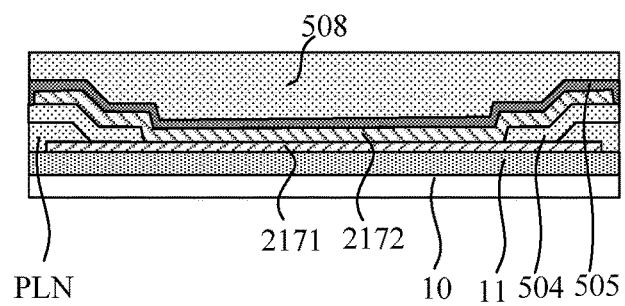

In some exemplary implementations, as shown in FIG. 13b, the second input-output wiring 2172 is disposed in a same layer as the first touch metal layer, and the first input-output wiring 2171 and the second input-output wiring 2172 are electrically connected through a groove or a via hole penetrating the buffer layer 504.

Figure 13C:
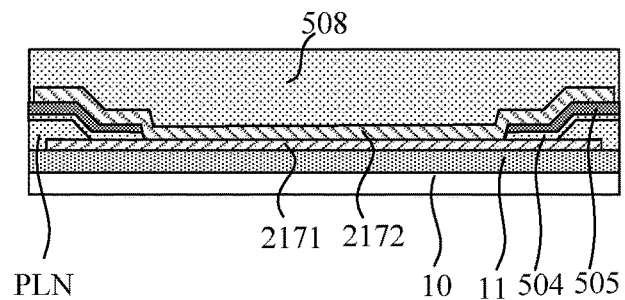

In some other exemplary implementations, as shown in FIG. 13c, the second input-output wiring 2172 is disposed in a same layer as the second touch metal layer, and the first input-output wiring 2171 and the second input-output wiring 2172 are electrically connected through a groove or a via hole that penetrates the buffer layer 504 and the touch insulating layer 505.

Figure 13D:
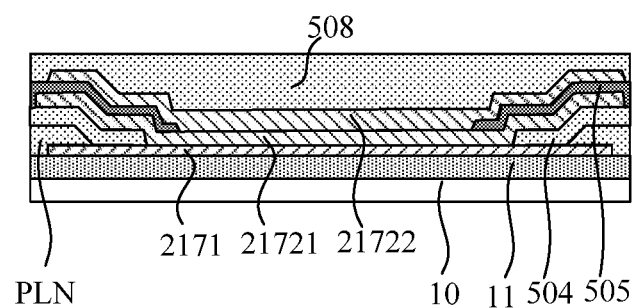

In some further exemplary implementations, as shown in FIG. 13d, the second input-output wiring 2172 includes a ninth sub-wiring 21721 and a tenth sub-wiring 21722, the ninth sub-wiring 21721 is disposed in a same layer as the first touch metal layer, the tenth sub-wiring 21722 is disposed in a same layer as the second touch metal layer, the first input-output wiring 2171 and the ninth sub-wiring 21721 are electrically connected through a groove or a via hole that penetrates the buffer layer 504, and the ninth sub-wiring 21721 and the tenth sub-wiring 21722 are electrically connected through a groove or a via hole that penetrates the touch insulating layer 505.

Figure 13E:
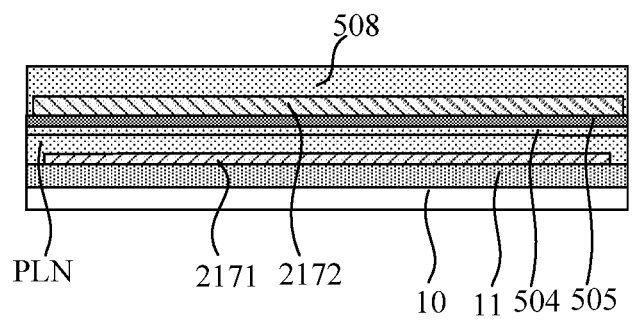

In some further exemplary implementations, as shown in FIG. 13e, an insulating layer is included between the source-drain metal layer and the touch metal layer, the first input-output wiring 2171 and the second input-output wiring 2172 are isolated by the insulating layer, and are electrically connected through the drive chip pin 2151 and the bonding pin 2161. Since the drive chip pin 2151 and the bonding pin 2161 each have a film layer of a touch metal layer, film layers such as the planarization (PLN) layer, the buffer layer 504 and the touch insulating layer 505 may not be removed from the first input-output wiring 2171, that is, the first input-output wiring 2171 and the second input-output wiring 2172 are isolated by the insulating layer and electrically connected through the drive chip pin 2151 and the bonding pin 2161.

In some further exemplary implementations, the source-drain metal layer includes a first source-drain metal layer and a second source-drain metal layer (not shown in figures);
- the first input-output wiring is arranged in a same layer as the first source-drain metal layer; or,
- the first input-output wiring is arranged in a same layer as the second source-drain metal layer; or,
- the first input-output wiring includes an eleventh sub-wiring and a twelfth sub-wiring, the eleventh sub-wiring is arranged in a same layer as the first source-drain metal layer, and the twelfth sub-wiring is arranged in a same layer as the second source-drain metal layer.

An exemplary embodiment of the present disclosure further provides a method for preparing a display substrate, including:
- forming a source-drain metal layer, wherein the source-drain metal layer includes a first wiring;
- forming an insulating layer on the source-drain metal layer; and
- forming a touch metal layer on the insulating layer, wherein the touch metal layer includes a second wiring, there is an overlapping area between an orthographic projection of the first wiring on a base substrate and an orthographic projection of the second wiring on the base substrate, and the first wiring and the second wiring form a double-layer wiring structure.

In an exemplary embodiment, the display substrate includes a display area, a bonding area located on a side of the display area, and a bezel area located on other sides of the display area, the bonding area includes a first fan-out region and a bonding pin region, and the preparation method includes:
- forming a source-drain metal layer, wherein the source-drain metal layer includes a first power supply line located in the bezel area and a first fan-out region and extending from the first fan-out region to the bonding pin region;
- forming an insulating layer on the source-drain metal layer, and forming on the insulating layer a groove or a via hole penetrating the insulating layer, wherein the groove or the via hole exposes the first power supply line; and
- forming a touch metal layer on the insulating layer, wherein the touch metal layer includes a first auxiliary power supply line, the first auxiliary power supply line is located in the bezel area and the first fan-out region, there is an overlapping area between an orthographic projection of the first power supply line on the base substrate and an orthographic projection of the first auxiliary power supply line on the base substrate, and the first power supply line and the first auxiliary power supply line are electrically connected through the groove or the via hole.

In an exemplary embodiment, the display substrate includes a display area, and a bonding area located on a side of the display area, the bonding area sequentially includes a first fan-out region, a bending region, a drive chip region and a bonding pin region in a direction away from the display area, and the preparation method including:
- forming a source-drain metal layer, wherein the source-drain metal layer includes a second power supply line located in the display area and the first fan-out region and extending from the first fan-out region to the bonding pin region;
- forming an insulating layer on the source-drain metal layer, and forming on the insulating layer a groove or a via hole penetrating the insulating layer, wherein the groove or the via hole exposes the second power supply line; and
- forming a touch metal layer on the insulating layer, wherein the touch metal layer includes a second auxiliary power supply line, the second auxiliary power supply line is located in the bonding area and located on a side of the bending region away from the display area, there is an overlapping area between an orthographic projection of the second power supply line on the base substrate and an orthographic projection of the second auxiliary power supply line on the base substrate, and the second power supply line and the second auxiliary power supply line are electrically connected through the groove or the via hole.

In an exemplary embodiment, the display substrate includes a display area, and a bonding area located on a side of the display area. The bonding area includes a drive chip region and a bonding pin region. The drive chip region includes a drive chip pin and the bonding pin region includes a bonding pin, and the preparation method includes:
- forming a source-drain metal layer, wherein the source-drain metal layer includes a first input-output wiring located between the drive chip region and the bonding pin region and connected to the drive chip pin and the bonding pin;
- forming an insulating layer on the source-drain metal layer; and
- forming a touch metal layer on the insulating layer, wherein the touch metal layer includes a second input-output wiring, and there is an overlapping area between an orthographic projection of the first input-output wiring on the base substrate and an orthographic projection of the second input-output wiring on the base substrate.

An embodiment of the present disclosure further provides a display apparatus, including a display substrate according to the preceding embodiments. The display apparatus may be any product or component with a display function, such as a mobile phone, a tablet computer, a television, a display, a laptop computer, a digital photo frame and a navigator.

Although the implementations disclosed in the present disclosure are described as above, the described contents are only implementations which are used for facilitating the understanding of the present disclosure, and are not intended to limit the present invention. Any skilled person in the art to which the present disclosure pertains may make any modifications and variations in forms and details of implementation without departing from the spirit and scope of the present disclosure. However, the patent protection scope of the present invention should still be subject to the scope defined by the appended claims.

The invention claimed is:

1. A display substrate, wherein on a plane perpendicular to the display substrate, the display substrate comprises a source-drain metal layer located on a base substrate, an insulating layer located on the source-drain metal layer, and a touch metal layer located on the insulating layer, the source-drain metal layer comprises a first wiring, the touch metal layer comprises a second wiring, there is an overlapping area between an orthographic projection of the first wiring on the base substrate and an orthographic projection of the second wiring on the base substrate, and the first wiring and the second wiring form a double-layer wiring structure;
wherein the display substrate comprises a display area, a bonding area located on a side of the display area, and a bezel area located on other sides of the display area, the bonding area comprises a first fan-out region and a bonding pin region; and
the first wiring comprises a first power supply line, the second wiring comprises a first auxiliary power supply line, the first power supply line is located in the bezel area and the first fan-out region, and extends from the first fan-out region to the bonding pin region, the first auxiliary power supply line is located in the bezel area and the first fan-out region, there is an overlapping area between an orthographic projection of the first power supply line on the base substrate and an orthographic projection of the first auxiliary power supply line on the base substrate.

2. The display substrate according to claim 1, wherein the first power supply line and the first auxiliary power supply line are electrically connected through a groove or a via hole penetrating the insulating layer.

3. The display substrate according to claim 2, wherein the touch metal layer comprises a first touch metal layer and a second touch metal layer;
the first auxiliary power supply line is arranged in a same layer as the first touch metal layer; or,
the first auxiliary power supply line is arranged in a same layer as the second touch metal layer; or,
the first auxiliary power supply line comprises a first sub-wiring and a second sub-wiring, the first sub-wiring is arranged in a same layer as the first touch metal layer, and the second sub-wiring is arranged in a same layer as the second touch metal layer.

4. The display substrate according to claim 2, wherein the bezel area comprises at least one isolation dam disposed around the display area;
an orthographic projection of the first auxiliary power supply line on the base substrate does not overlap with an orthographic projection of the at least one isolation dam on the base substrate, and a distance between the first auxiliary power supply line and the display area is greater than a distance between the at least one isolation dam and the display area.

5. The display substrate according to claim 2, wherein the bezel area comprises at least one isolation dam disposed around the display area;
an orthographic projection of the first auxiliary power supply line on the base substrate at least covers a portion of an orthographic projection of the isolation dam on the base substrate.

6. The display substrate according to claim 2, wherein the insulating layer comprises an encapsulation structure layer, a buffer layer and a touch insulating layer; the groove comprises a first groove and a third groove, the first groove penetrates the touch insulating layer and the buffer layer, and the third groove penetrates the encapsulation structure layer.

7. The display substrate according to claim 6, wherein an orthographic projection of the first groove on the base substrate covers an orthographic projection of the third groove on the base substrate.

8. The display substrate according to claim 1, wherein the bonding area sequentially comprises the first fan-out region, a bending region, a drive chip region and the bonding pin region in a direction away from the display area;
the first wiring further comprises a second power supply line, the second wiring further comprises a second auxiliary power supply line, the second power supply line is located in the display area and the first fan-out region, and extends from the first fan-out region to the bonding pin region, the second auxiliary power supply line is located in the bonding area and located on a side of the bending region away from the display area, and there is an overlapping area between an orthographic projection of the second power supply line on the base substrate and an orthographic projection of the second auxiliary power supply line on the base substrate;
the second power supply line and the second auxiliary power supply line are electrically connected through a groove or a via hole penetrating the insulating layer.

9. The display substrate according to claim 8, wherein the touch metal layer comprises a first touch metal layer and a second touch metal layer;
the second auxiliary power supply line is arranged in a same layer as the first touch metal layer; or
the second auxiliary power supply line is arranged in a same layer as the second touch metal layer; or
the second auxiliary power supply line comprises a fifth sub-wiring and a sixth sub-wiring, the fifth sub-wiring is arranged in a same layer as the first touch metal layer, and the sixth sub-wiring is arranged in a same layer as the second touch metal layer.

10. The display substrate according to claim 8, wherein in the bonding area, the second power supply line comprises a first transverse connection portion extending in a first direction and a first longitudinal connection portion extending in a second direction; the second auxiliary power supply line comprises a second transverse connection portion extending in the first direction and a second longitudinal connection portion extending in the second direction;
the first transverse connection portion and the second transverse connection portion are each arranged between the bending region and the drive chip region, there is an overlapping area between an orthographic projection of the first transverse connection portion on the base substrate and an orthographic projection of the second transverse connection portion on the base substrate; and there is an overlapping area between an orthographic projection of the first longitudinal connection portion on the base substrate and an orthographic projection of the second longitudinal connection portion on the base substrate.

11. The display substrate according to claim 10, wherein the first longitudinal connection portion comprises a plurality of first branches and a plurality of second branches, the first branches extend from an end of the first transverse connection portion in the first direction to the bonding pin region, the second branches extend from the first transverse connection portion to the display area, the second longitudinal connection portion extends from an end of the second transverse connection portion in the first direction to the bonding pin region, and there is an overlapping area between an orthographic projection of the first branches on the base substrate and an orthographic projection of the second longitudinal connection portion on the base substrate.

12. A display apparatus, comprising the display substrate according to claim 1.

13. A method for preparing a display substrate, comprising:
forming a source-drain metal layer, the source-drain metal layer comprising a first wiring;
forming an insulating layer on the source-drain metal layer;
forming a touch metal layer on the insulating layer, wherein the touch metal layer comprises a second wiring, there is an overlapping area between an orthographic projection of the first wiring on a base substrate and an orthographic projection of the second wiring on the base substrate, and the first wiring and the second wiring form a double-layer wiring structure;
wherein the display substrate comprises a display area, a bonding area located on a side of the display area, and a bezel area located on other sides of the display area, the bonding area comprises a first fan-out region and a bonding pin region; and
the first wiring comprises a first power supply line, the second wiring comprises a first auxiliary power supply line, the first power supply line is located in the bezel area and the first fan-out region, and extends from the first fan-out region to the bonding pin region, the first auxiliary power supply line is located in the bezel area and the first fan-out region, there is an overlapping area between an orthographic projection of the first power supply line on the base substrate and an orthographic projection of the first auxiliary power supply line on the base substrate.

* * * * *